(12) United States Patent
Iizuka

(10) Patent No.: US 7,778,467 B2
(45) Date of Patent: Aug. 17, 2010

(54) IMAGE MATCHING SYSTEM AND IMAGE MATCHING METHOD AND PROGRAM

(75) Inventor: Ken Iizuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1703 days.

(21) Appl. No.: 10/768,088

(22) Filed: Feb. 2, 2004

(65) Prior Publication Data

US 2004/0218815 A1    Nov. 4, 2004

(30) Foreign Application Priority Data

Feb. 5, 2003    (JP)    ............................. 2003-067307

(51) Int. Cl.
*G06K 9/62*    (2006.01)
(52) U.S. Cl. ..................................... 382/209
(58) Field of Classification Search ................. 382/209, 382/289–297, 100
See application file for complete search history.

(56) References Cited

U.S. PATENT DOCUMENTS

| | | | | |
|---|---|---|---|---|
| 4,267,573 | A * | 5/1981 | Chaikin et al. | 382/296 |
| 6,282,300 | B1 * | 8/2001 | Bloom et al. | 382/100 |
| 6,307,981 | B1 * | 10/2001 | Kamei et al. | 382/309 |
| 2002/0090109 | A1 * | 7/2002 | Wendt | 382/100 |
| 2002/0102007 | A1 * | 8/2002 | Wang | 382/100 |
| 2002/0126870 | A1 * | 9/2002 | Wendt | 382/100 |
| 2002/0154821 | A1 * | 10/2002 | Akiyoshi et al. | 382/218 |
| 2003/0039405 | A1 * | 2/2003 | Oosawa | 382/294 |

(Continued)

FOREIGN PATENT DOCUMENTS

JP    10-124667    5/1998

(Continued)

OTHER PUBLICATIONS

Hiroshi Sasaki, Koji Koboyashi, Takafumi Aoki, Masayuki Kawamata, Tatsuo Higuchi, "The Measurement of Rotation Angle of the Image by the Rotation Invariant Phase-Limited Correlation," Institute of Image Information and Television Engineers technical report, Japan, Institute of Image Information and Television Engineers, Sep. 14, 1998, vol. 22, No. 45, p. 55-60.

(Continued)

*Primary Examiner*—Vu Le
*Assistant Examiner*—Tsung-Yin Tsai
(74) *Attorney, Agent, or Firm*—Oblon, Spivak, McClelland, Maier & Neustadt, L.L.P.

(57) ABSTRACT

An image matching system, method, and program for matching two images even if there is a difference of parallel movement, rotation angle, and scale between two images. A Fourier-Mellin transform is a Fourier transform and a log-polar coordinate transform to a registered image and a matching image. A phase only correlation unit and scalar information-rotation information generation unit generate correction information including scalar information and rotation information based on correlation strength of the phase information based on the transform result, a correction unit corrects the matching image RIM in accordance with the correction information, a parallel movement unit performs phase only correlation based on the image resulting from the correction processing and the registered image, a correlation value generation unit generates a correlation value based on the correlation image data, and a judgment unit performs judgment concerning the matching based on the correlation value.

25 Claims, 17 Drawing Sheets

U.S. PATENT DOCUMENTS

2003/0169910 A1* 9/2003 Reisman et al. ............ 382/124

FOREIGN PATENT DOCUMENTS

| JP | 2000-268178 | 9/2000 |
|---|---|---|
| JP | 3254622 | 11/2001 |
| JP | 2003-153082 | 5/2003 |

OTHER PUBLICATIONS

Nobuhumi Sasaki, Kenji Takita, Takafumi Aoki, Tatsuo Higuchi, Koji Kobayashi, "High Accuracy Registration based on the Phase-limited Correlation Method," Institute of Electronics, Information and Communication Engineers Technical Study Reports [Imaging Engineering], Japan, Institute of Electronics, Information and Communication Engineers, Apr. 11, 2002, vol. 102, No. 11, p. 49-54, IE2002-9.

Yagi, "Image Processing and Lighting 4, Correlation of the Fluctuation of Lighting Part (2)," Image Information, Japan Industry Development Organization, Jul. 1, 2000, vol. 32, No. 13, p. 48-53, 92.

* cited by examiner

FIG. 6
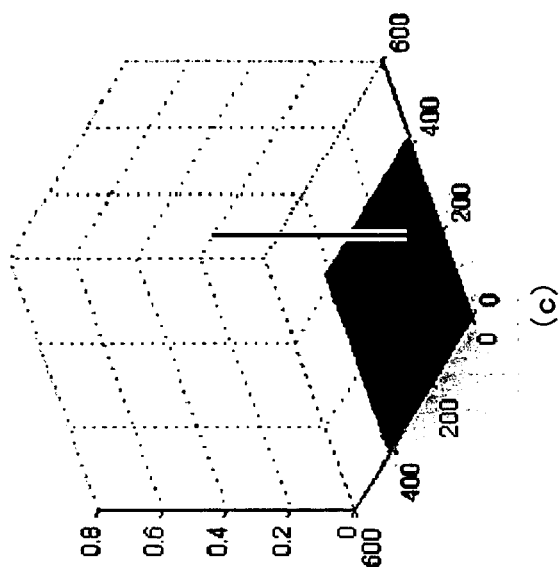

FIG. 7
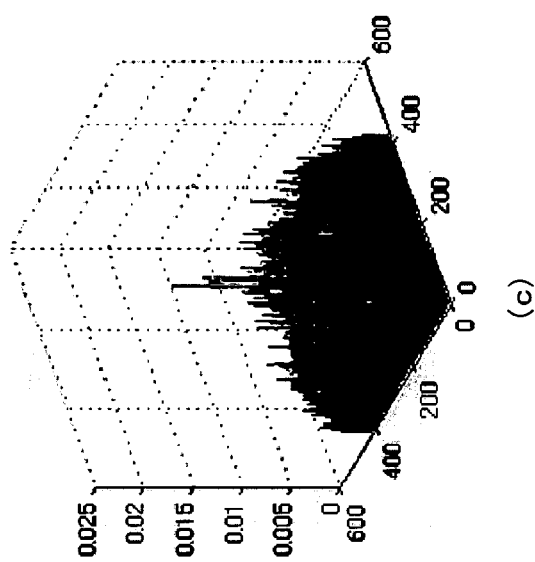
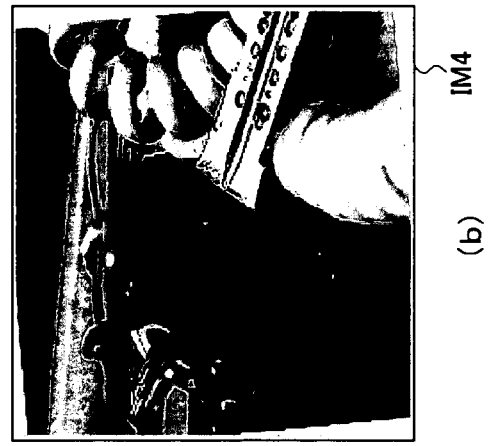

FIG. 9
RIPOC AND FMI
(RIPOC)
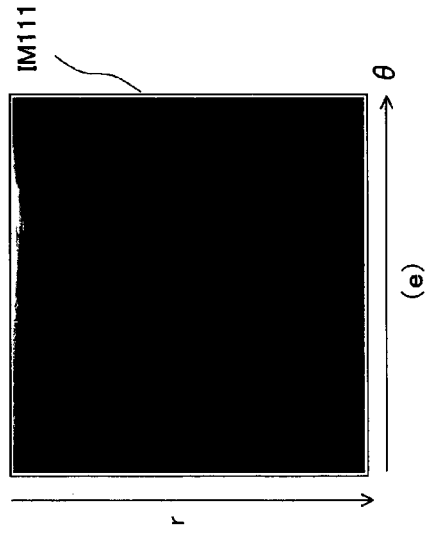
(a) (ORIGINAL IMAGE) AIM1
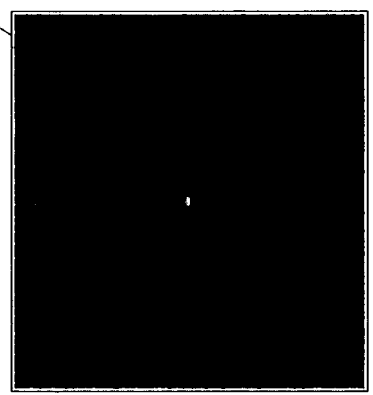
(c) (TWO-DIMENSIONAL FFT) IM11
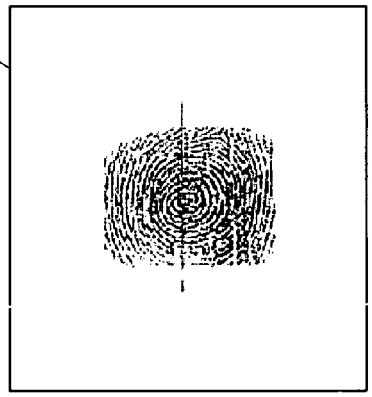
(e) (POLAR COORDINATE TRANSFORM) IM111
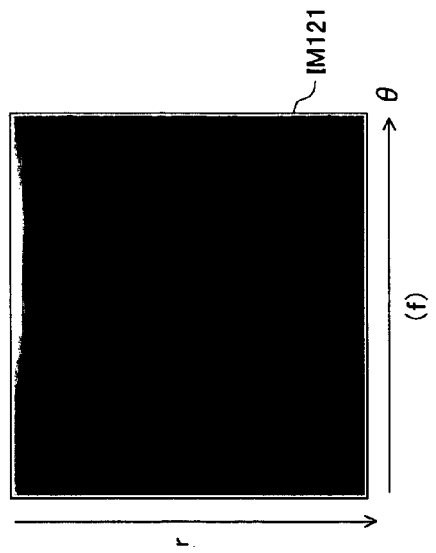
(b) RIM1
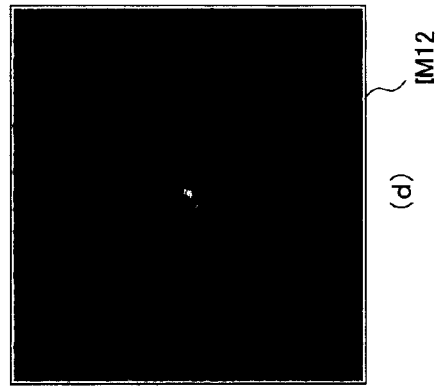
(d) IM12
(f) IM121

FIG. 15
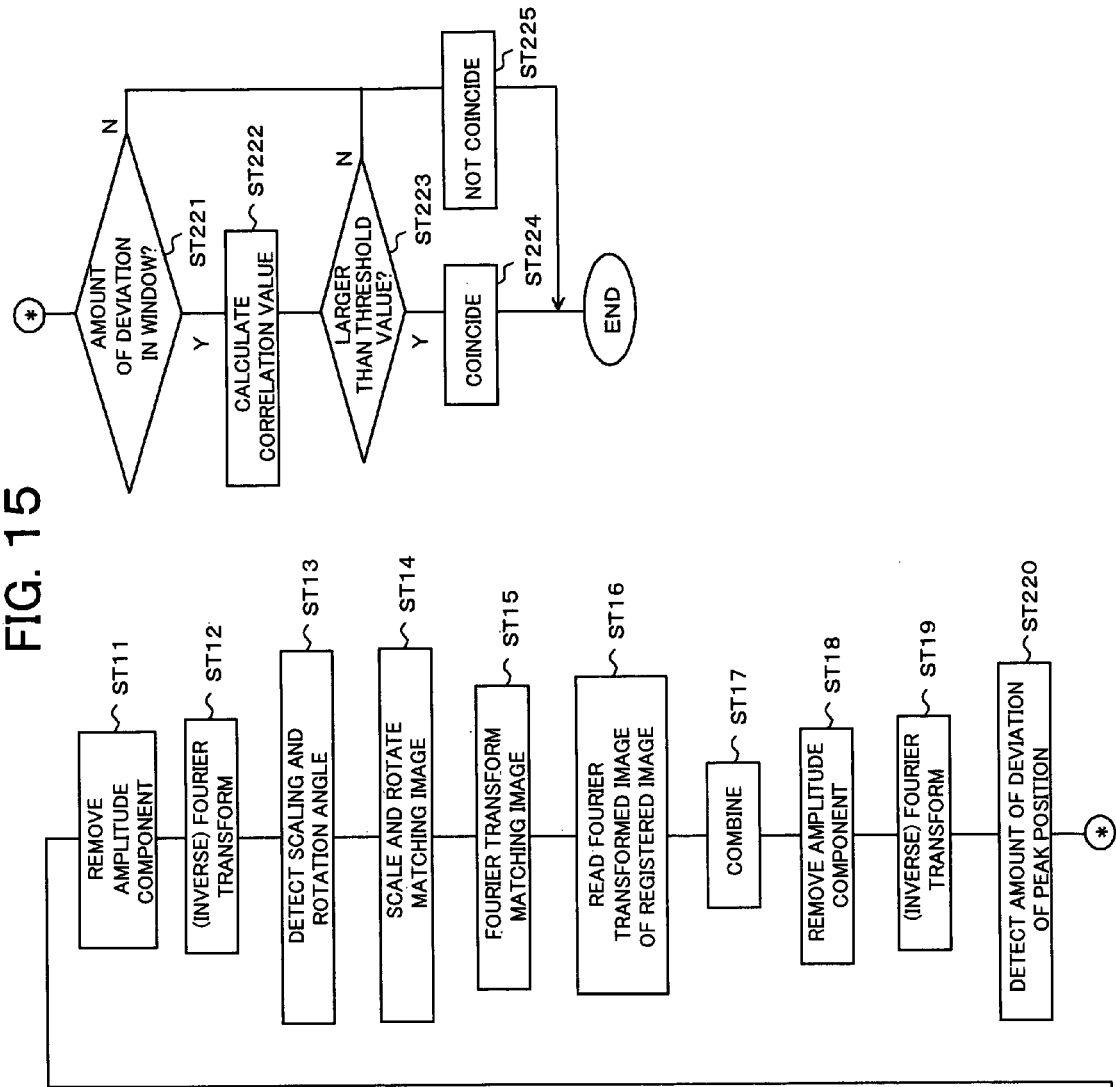
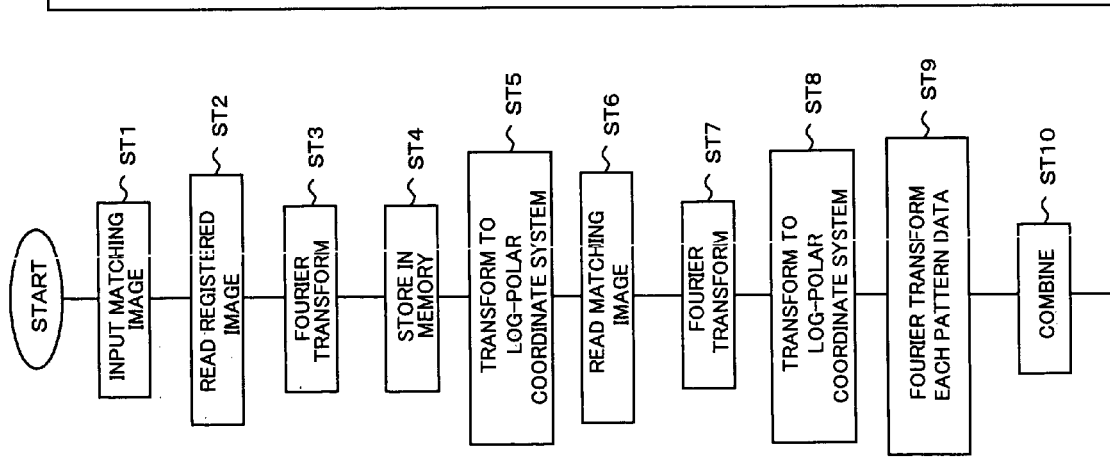

IMAGE MATCHING SYSTEM AND IMAGE MATCHING METHOD AND PROGRAM

BACKGROUND OF THE INVENTION

1. Field of the Invention

The present invention relates to an image matching system for matching images based on image information of for example fingerprint images, still images, and moving images and an image matching method and program.

2. Description of the Related Art

Conventionally, as a method for matching images based on image information, various pattern matching techniques have been known. For example, the technique of detecting an amount of parallel movement and a rotation angle between a registered image and a matching image to be compared with and positioning the two based on the detection results has been proposed. Further, a pattern matching technique for performing a discrete Fourier transform for each of the registered image and the matching image, calculating a degree of correlation based on phase information of each of the obtained pattern data, and matching the images based on the correlation result has been known (for example, see Japanese Unexamined Patent Publication (Kokai) No: 10-55439).

Summarizing the problem to be solved by the invention, the above pattern matching system detecting the amount of parallel movement and the rotation angle, however, cannot obtain correspondence of images and suitably match images when for example the scalings of the registered image and the matching image are different. Further, the pattern matching system performing the discrete Fourier transform and matching images based on the amplitude component of each of the obtained pattern data processes the registered image or the matching image to scale it based on the amplitude component and matches the images based on the processing results, but cannot detect the rotation angle. For this reason, an image matching system for matching two images even if there are differences in the amount of parallel movement, the rotation angle, and the scaling between images has been demanded.

SUMMARY OF THE INVENTION

An object of the present invention is to provide an image matching system and an image matching method and program able to match images even if there are differences in the amount of parallel movement, the rotation angle, and the scaling between images.

To attain the above object, according to a first aspect of the present invention, there is provided an image matching system for matching a first image and a second image, comprising a correction information generating means for performing a Fourier transform and a log-polar coordinate transform to the first image and the second image and generating correction information of the first image based on the results of the Fourier transform and log-polar coordinate transform and a matching means for performing processing of correction of the first image based on the correction information generated by the correction information generating means, processing of correlation of the corrected first image and the second image, and processing of matching the results of the correlation processing.

According to the-first aspect of the present invention, the correction information generating means performs a Fourier transform and log-polar coordinate transform to the first image and the second image and generates correction information of the first image based on the results of the Fourier transform and the log-polar coordinate transform. The matching means performs processing of correction of the first image based on the correction information generated by the correction information generating means, processing of correlation of the corrected first image and second image, and processing of matching the results of the correlation processing.

Preferably, the correction information generating means performs a further Fourier transform based on the results of the log-polar coordinate transform of the first image and the second image and generates scalar information and/or rotation information as the correction information based on correlation strength of the Fourier transformed first image and second image, and the matching means performs processing of correction of the first image based on the scalar information and/or the rotation information generated by the correction information generating means.

More preferably, the correction information generating means generates the scalar information and/or rotation information as the correction information based on correlation strength of phase information the Fourier transformed first image and second image.

Alternatively, the correction information generating means performs a Fourier-Mellin transform to the first image and the second image, performs processing for correlation between the Fourier-Mellin transformed first image and second image, and generates the scalar information and/or rotation information as the correction information.

More preferably, the matching means performs processing of correction of the first image based on the scalar information and/or the rotation information generated by the correction information generating means, performs processing for Fourier transform to the corrected first image and second image, and performs correlation processing based on the Fourier transformed first image and second image.

Alternatively, more preferably, the matching means performs processing of correction of the first image based on the scalar information and/or the rotation information generated by the correction information generating means, performs processing for Fourier transform to the corrected first image and second image, and performs correlation processing based on phase information of the Fourier transformed first image and second image.

Alternatively, the matching means generates parallel movement information of the corrected first image and second image based on a peak position of correlation strength of phase information of the corrected first image and second image, extracts common areas of the first image and the second image based on the movement amount information, performs processing for correlation of the extracted common areas, and performs processing for matching the first image and the second image based on the results of the correlation processing.

Alternatively, the matching means generates parallel movement information of the corrected first image and second image based on a peak position of correlation strength of phase information of the corrected first image and second image and performs processing for matching the first image and the second image when the parallel movement information is smaller than a predetermined amount of parallel movement.

Further, to attain the above object, according to a second aspect of the present invention, there is provided an image matching method for matching a first image and a second image, comprising a first step of performing a Fourier transform and a log-polar coordinate transform to the first image and the second image and generating correction information of the first image based on the results of the Fourier transform and log-polar coordinate transform and a second step of performing processing of correction of the first image based on the correction information generated in the first step, processing of correlation of the corrected first image and the second image, and processing of matching the results of the correlation processing.

In the second aspect of the invention, there are the same preferable embodiments as explained in relation with the first aspect of the invention. In this case, read "correction information generating means" as "first step " and "matching means" as "second step".

Further, to attain the above object, according to a third aspect of the present invention, there is provided a program to be executed by an information processing apparatus for performing processing for matching a first image and a second image, comprising a first routine for performing a Fourier transform and a log-polar coordinate transform to the first image and the second image and generating correction information of the first image based on the results of the Fourier transform and log-polar coordinate transform and a second routine for performing processing for correction the first image to the correction information generated by the first routine, processing for correlation of the corrected first image and the second image, and processing for matching the results of the correlation processing.

In the third aspect of the invention, there are the same preferable embodiments as explained in relation with the first aspect of the invention. In this case, read "correction information generating means" as "first routine" and "matching means" as "second routine".

BRIEF DESCRIPTION OF THE DRAWINGS

These and other objects and features of the present invention will become clearer from the following description of the preferred embodiments given with reference to the attached drawings, wherein:

FIGS. 6A to 6C are views for explaining a correlation strength distribution where there is deviation in parallel movement between two images in the phase only correlation method;

FIGS. 7A to 7C are views for explaining a correlation strength distribution where there is deviation in rotation between two images in the phase only correlation method;

FIGS. 9A to 9F are views for explaining a general polar coordinate transform in the case of fingerprint images as the registered image and the matching image;

FIG. 15 is a flow chart for explaining the operation of the image matching system shown in FIG. 14;

DESCRIPTION OF THE PREFERRED EMBODIMENTS

Figure 1:
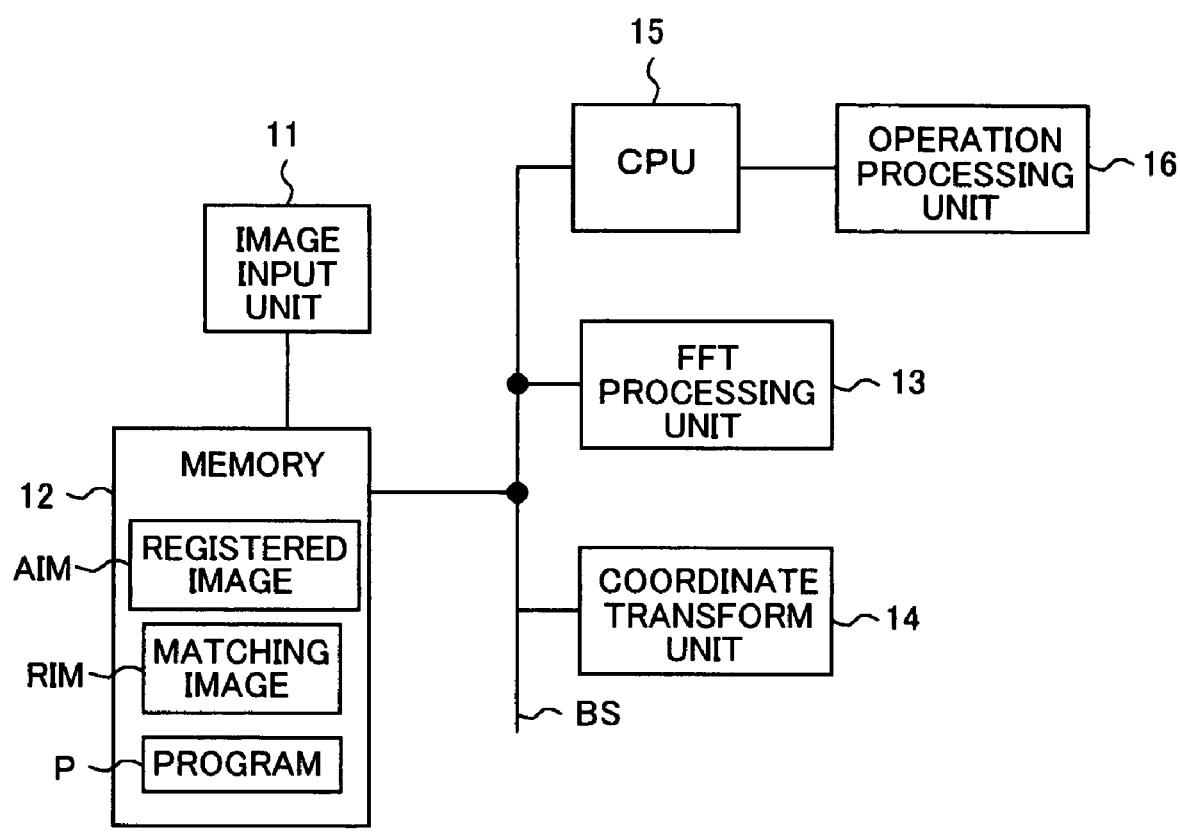
FIG. 1 is a functional block diagram of an image matching system according to a first embodiment of the present invention.

Preferred embodiments of the present invention will be described in detail below while referring to the attached figures. FIG. 1 is a functional block diagram of an image matching system according to a first embodiment of the present invention. The image matching system 1 according to the present embodiment has, for example as shown in FIG. 1, an image input unit 1, a memory 12, an FFT processing unit 13, a coordinate transform unit 14, a CPU 15, and an operation processing unit 16. The image input unit 11, the memory 12, the FFT processing unit 13, the coordinate transform unit 14, and the CPU 15 are connected by a bus BUS. The operation processing unit 16 is connected to the CPU 15.

The image input unit 11 is an input unit for inputting an image from the outside. For example, the image input unit 11 receives as input a registered image AIM and an image to be compared with the registered image AIM (referred to as a "matching image RIM") are input. The memory 12 stores the images etc. input from the image input unit 11. For example, the memory 12 stores the registered image AIM, the matching image RIM, and a program P. The program P includes routines to be executed by for example the CPU 15 for the correlation processing, the correction processing, the matching processing, etc. according to the present invention. The FFT processing unit 13 performs two-dimensional Fourier transform processing based on the images stored in the memory 12 under the control of for example the CPU 15 and outputs the processing results to the coordinate transform unit 14 and the CPU 15.

The coordinate transform unit 14 transforms the results to log-polar coordinates based on the results of the two-dimensional Fourier transform processing from the FFT processing unit under the control of for example the CPU 15 and outputs the processing results to-the CPU 15. The operation processing unit 16 performs the predetermined processing for releasing an electronic lock etc. when for example the two images coincide based on the results of the matching processing of the CPU 15 mentioned later. The CPU 15 performs the matching processing according to the embodiment of the present invention based on the program P, the registered image AIM, and the matching image RIM stored in for example the memory 12. Further, the CPU 15 controls the image input unit 11, the memory 12, the FFT processing unit 13, the coordinate transform unit 14, the operation processing unit 16, etc. to execute the processing according to the present embodiment.

Figure 2:
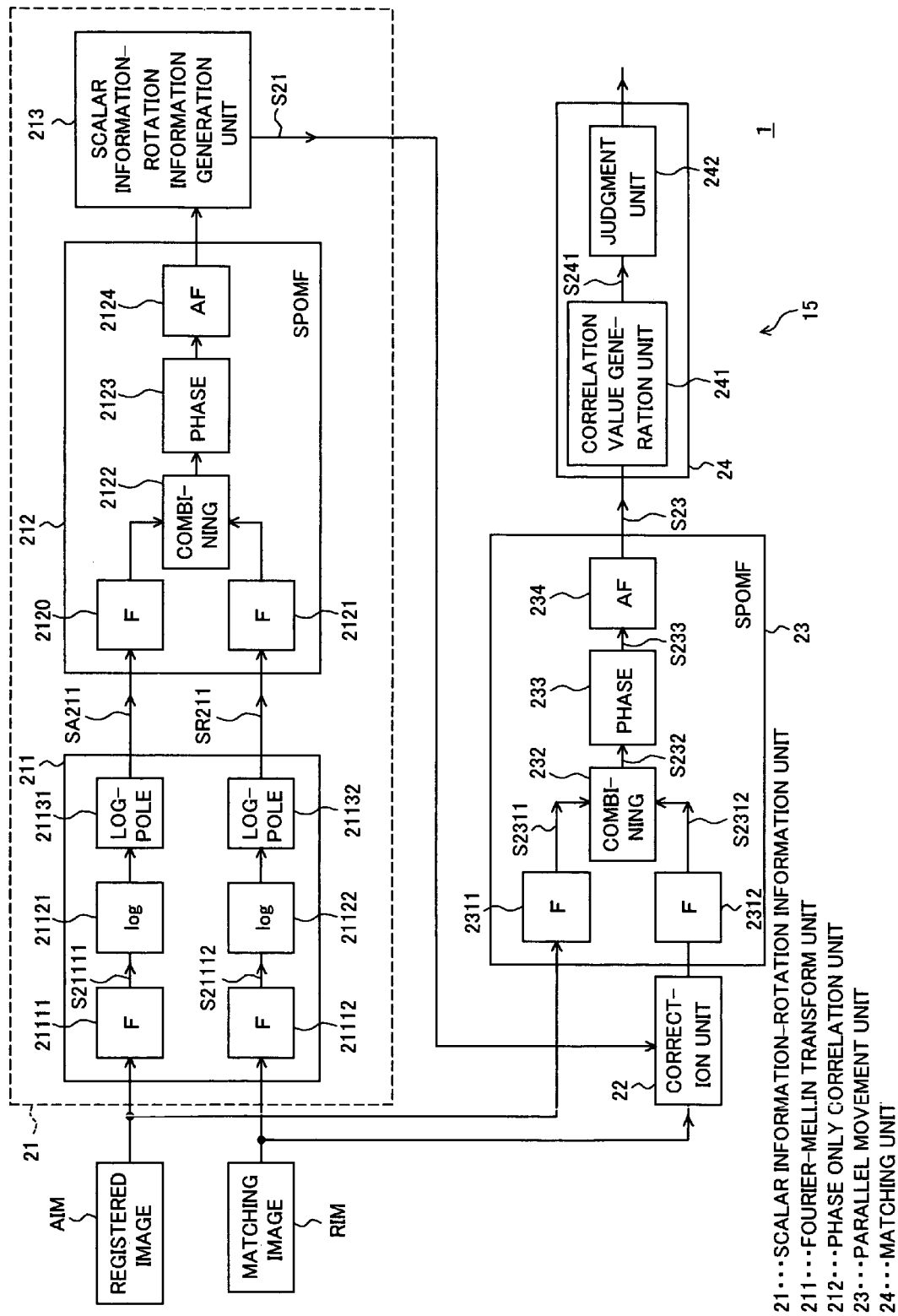
FIG. 2 is a software-like functional block diagram of the image matching system shown in FIG. 1.

FIG. 2 is a software-like functional block diagram of the image matching system shown in FIG. 1. The CPU 15 controls the FFT processing unit 13, the coordinate transform unit 14, etc. and performs the processing based on for example the functional blocks as shown in FIG. 2. The CPU 15 has, as shown in FIG. 2, a scalar information-rotation information unit 21, a correction unit 22, a parallel movement unit 23, and a matching unit 24.

The scalar information-rotation information unit 21 generates scalar information and/or rotation information based on the registered image AIM and the matching image RIM and outputs the same to the correction unit 22. The scalar information includes information indicating the scaling of the registered image AIM and the matching image RIM. The rotation information includes information indicating the rotation angle of the registered image AIM and the matching image RIM.

In more detail, for example the scalar information-rotation information unit 21 has a Fourier-Mellin transform unit 211, a phase only correlation unit 212, and a scalar information-rotation information generation unit 213. The Fourier-Mellin transform unit 211 performs the Fourier-Mellin transform mentioned later based on each image information and outputs signals SA211 and SR211 indicating the transform results to the phase only correlation unit 212.

In more detail, the Fourier-Mellin transform unit 211 has Fourier transform units 21111 and 21112, log transform units 21121 and 21122, and log-polar coordinate transform units 21131 and 21132.

The Fourier transform unit 21111 performs the Fourier transform as shown in Equation (1), where the registered image AIM is f1(m,n) in the case where for example the registered image AIM is an image comprised of N×N images, generates Fourier image data F1(m,n), and outputs the same to the log transform unit 21121. The Fourier transform unit 21112 performs the Fourier transform as shown in Equation (2) where the matching image RIM is f2(m,n) in the case where for example the matching image RIM is an image comprised by N×N images, generates Fourier image data F2(m,n), and outputs the same to the log transform unit 21122.

The Fourier image data F1(m,n) is comprised by an amplitude spectrum A(u,v) and a phase spectrum Θ(u,v) as shown in Equation (1), while the Fourier image data F2(m,n) is comprised by an amplitude spectrum B(u,v) and a phase spectrum φ(u,v) as shown in Equation (2).

$$F1(u, v) = \sum_{m=0}^{N-1} \sum_{n=0}^{N-1} f1(m, n)e^{-j2\pi((mu+nv)/N)} = A(u, v)e^{j\Theta(u,v)} \quad (1)$$

$$F2(u, v) = \sum_{m=0}^{N-1} \sum_{n=0}^{N-1} f2(m, n)e^{-j2\pi((mu+nv)/N)} = B(u, v)e^{j\Phi(u,v)} \quad (2)$$

The log transform units 21121 and 21122 perform log processings based on the amplitude components of the Fourier image data F1(m,n) and F2(m,n) generated at the Fourier transform units 21111 and 21112. The log processings of the amplitude components emphasize high frequency components including detailed characteristic information of the image data.

In more detail, the log transform unit 21121 performs log processing based on the amplitude component A(u,v) as shown in Equation (3) to generate A'(u,v) and outputs the same to the log-polar coordinate transform unit 21131. The log transform unit 21122 performs log processing based on the amplitude component B(u,v) as shown in Equation (4) and outputs the same to the log-polar coordinate transform unit 21132.

$$A'(u,v) = \log(|A(u,v)|+1) \quad (3)$$

$$B'(u,v) = \log(|B(u,v)|+1) \quad (4)$$

The log-polar coordinate transform units 21131 and 21132 transform the signals output from the log transform units 21121 and 21122 to a log-polar coordinate system (for example log-r, Θ). In general, for example, when defining a point (x,y) as shown in Equations (5) and (6), μ=log(r) in the case of r=e^μ, and there is an unambiguous (log(r),Θ) corresponding to any point (x,y). Due to this nature, the log-polar coordinate transform units 21131 and 21132 perform coordinate transforms.

$$x = e^\mu \cos \Theta \quad (5)$$

$$y = e^\mu \sin \Theta (0 \leq \Theta \leq 2\pi) \quad (6)$$

In more detail, the log-polar coordinate transform units 21131 and 21132 define a set $(r_i, \theta_j)$ shown in Equation (7) and a function $f(r_i, \theta_j)$ shown in Equation (8).

$$(r_i, \theta_j): r_i = (1/2)N^{i/N}, \theta_j = 2\pi j/N - \pi f(r_i, \theta_j) = (r_i \cos \theta_j + N/2, r_i \sin \theta_j + N/2) \quad (7)$$

$$(i=0, 1, \ldots, N-1, j=0, 1, \ldots, N-1) \quad (8)$$

The log-polar coordinate transform units 21131 and 21132 perform the log-polar coordinate transforms as shown in Equations (9) and (10) on the image data A'(u,v) and B'(u,v) by using the set $(r_i, \theta_j)$ and the function $f(r_i, \theta_j)$ defined by Equations (7) and (8), generate $pA(r_i, \theta_j)$ and $pB(r_i, \theta_j)$, and output them as the signal SA211 and the signal SR211 to the phase only correlation unit 212.

$$pA(r_i, \theta_j) = A'(f(r_i, \theta_j)) \quad (9)$$

$$pB(r_i, \theta_j) = B'(f(r_i, \theta_j)) \quad (10)$$

Figure 3:
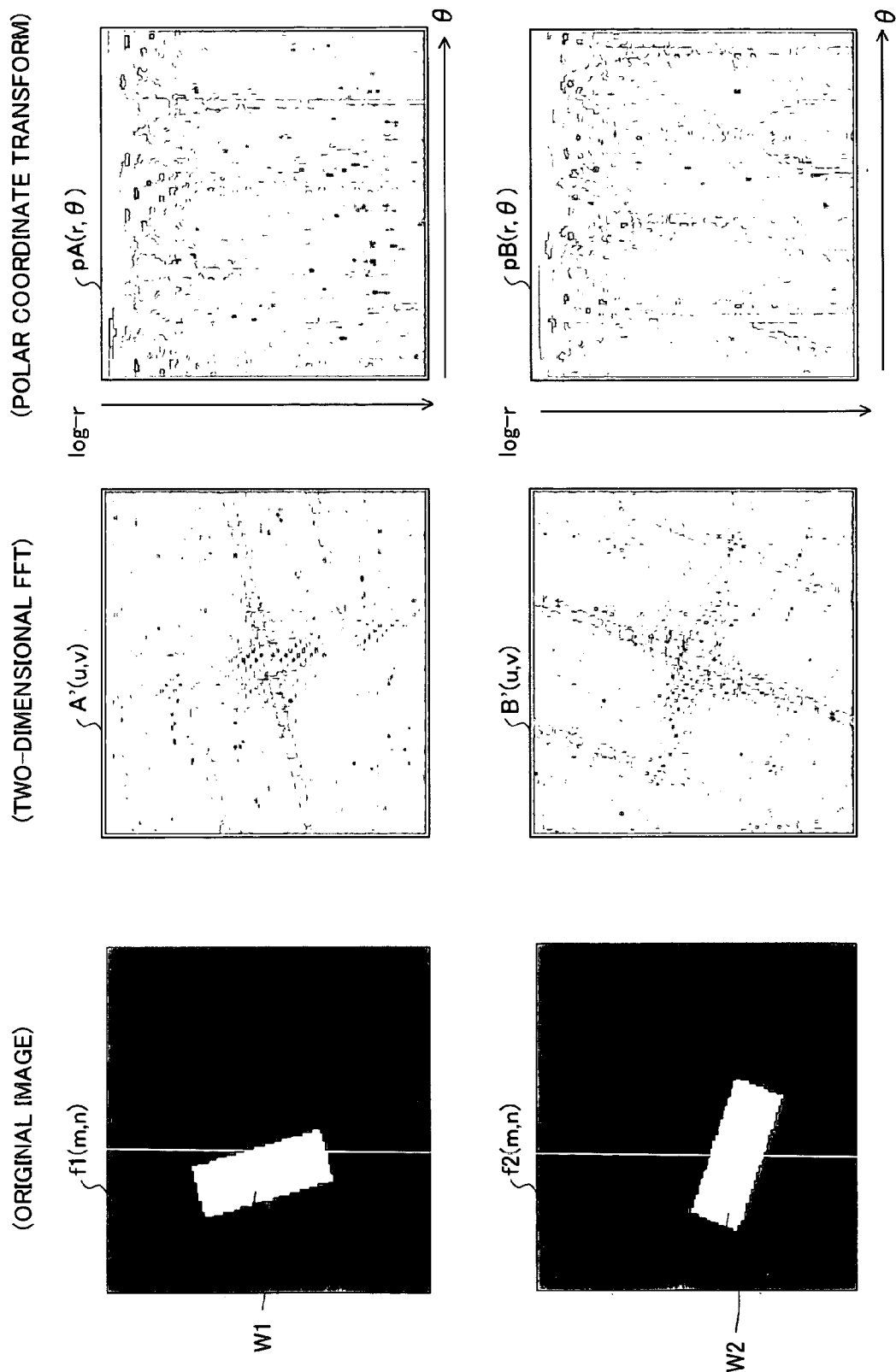
FIG. 3 is a view for explaining an operation of a Fourier-Mellin transform unit shown in FIG. 2.

FIG. 3 is a view for explaining the operation of the Fourier-Mellin transform unit 211 shown in FIG. 2. The image f1(m, n) and the image f2(m,n) include rectangular areas W1 and W2 having different predetermined angles with respect to for example the x,y axes. The Fourier-Mellin transform unit 211, for example, as shown in FIG. 3, performs a Fourier transform on the image f1(m,n) by the Fourier transform unit 21111 to generate the Fourier image data A'(u, v) and generates the image data pA(r,θ) by the log transform unit 21121 and the log-polar coordinate transform unit 21131. In the same way, it performs a Fourier transform on the image f2(m,n) by the Fourier transform unit 21112 to generate the Fourier image data B'(u,v) and generates the image data pB(r,θ) by the log transform unit 21122 and the log-polar coordinate transform unit 21132.

As explained above, the images f1(m,n) and f2(m,n) are transformed from Cartesian coordinates to a log-polar coordinate system (also referred to as "Fourier-Mellin space") by the Fourier transform and the log-polar coordinate transform. In the Fourier-Mellin space, a component moves along the log-r axis in accordance with the scaling of the image and moves along the θ axis in accordance with the rotation angle of the image. By using this nature, the scaling (scalar information) and the rotation angle of the image f1(m,n) and f2(m,n) can be found based on the movement amount along the log-r axis and the movement amount along the axis θ in the Fourier-Mellin space.

The phase only correlation unit 212 finds the amounts of parallel movement by the phase only correlation method using for example a phase only filter (SPOMF: Symmetric phase-only matched filter) based on the signals SA212 and SR212 indicating the pattern data output from the Fourier-Mellin transform unit 211. The phase only correlation-unit 212 has, for example as shown in FIG. 1, Fourier transform units 2120 and 2121, a combining unit 2122, a phase extraction unit 2123, and an inverse Fourier transform unit 2124.

The Fourier transform units 2120 and 2121 perform the Fourier transforms by Equations (11) and (12) based on the signals SA211 (pA(m,n)) and SR211 (pB(m,n)) output from the log-polar coordinate transform units 21131 and 21132. Here, X(u,v) and Y(u,v) are Fourier coefficients. The Fourier coefficient X(u,v) is comprised of an amplitude spectrum C(u,v) and a phase spectrum θ(u,v) as shown in Equation (11). The Fourier coefficient Y(u,v) is comprised of an amplitude spectrum D(u,v) and a phase spectrum φ(u,v) as shown in Equation (12).

$$X(u, v) = \sum_{m=0}^{N-1} \sum_{n=0}^{N-1} pA(m, n)e^{-j2\pi((mu+nv)/N)} = C(u, v)e^{j\theta(u,v)} \quad (11)$$

$$F2(u, v) = \sum_{m=0}^{N-1} \sum_{n=0}^{N-1} f2(m, n)e^{-j2\pi((mu+nv)/N)} = B(u, v)e^{j\phi(u,v)} \quad (12)$$

The combining unit 2122 combines the X(u,v) and Y(u,v) generated at the Fourier transform units 2120 and 2121 and finds the correlation. For example, the combining unit 2122 generates X(u,v) Y*(u,v) and outputs the same to the phase extraction unit 2123. Here, Y*(u,v) is a complex conjugate of Y(u,v).

The phase extraction unit 2123 removes the amplitude component based on the combined signal output from the combining unit 2122 to extract the phase information. For example, the phase extraction unit 2123 extracts the phase component $Z(u,v) = e^{j(\theta(u,v)-\phi(u,v))}$ based on for example X(u, v), Y*(u,v).

The extraction of the phase information is not limited to the above format. For example, it is also possible to extract the phase information based on the outputs of for example the Fourier transform units 2120 and 2121 and Equations (13) and (14), then combine only the phase components to generate Z(u,v) as shown in Equation (15).

$$X'(u,v) = e^{j\theta(u,v)} \quad (13)$$

$$Y'(u,v) = e^{j\phi(u,v)} \quad (14)$$

$$Z(u,v) = X'(u,v)(Y'(u,v)) = e^{j(\theta(u,v)-\phi(u,v))} \quad (15)$$

The inverse Fourier transform unit 2124 performs the inverse Fourier transform processing based on the signal Z(u, v) of only the phase information output from the phase extraction unit 2123 to generate a correlation strength image. In more detail, the inverse Fourier transform unit 2124 performs inverse Fourier transform processing based on the signal Z(u, v) shown in Equation (16) to generate a correlation strength image G(p,q).

$$G(p, q) = \sum_{u=0}^{N-1} \sum_{v=0}^{N-1} (Z(u, v))e^{j2\pi((up+vq)/N)} \quad (16)$$

$$= \sum_{u=0}^{N-1} \sum_{v=0}^{N-1} (e^{j(\theta(u,v)-\phi(u,v))})e^{j2\pi((up+vq)/N)}$$

The scalar information-rotation information generation unit 213 detects an amount of deviation of the peak position in the correlation strength image G(p,q) generated by the inverse Fourier transform unit 2124 from the image center since the amount of deviation is equivalent to the amount of parallel movement between pattern data obtained as a result of performing Fourier-Mellin transforms on the registered image AIM and the matching image RIM and thereby generates the correction information S21 including the scalar information (scaling) and the rotation angle information of the matching image RIM with respect to the registered image AIM.

The correction unit 22 performs correction of the matching image RIM based on the correction information S21 output from the scalar information-rotation information generation unit 213 of the scalar information-rotation information unit 21. In more detail, the correction unit 22 performs scaling processing and rotation processing on the matching image RIM based on the scalar information and the rotation angle information included in the correction information S21 and outputs the result to the parallel movement unit 23. By the correction processing of the correction unit 22, the differences in the scaling and rotation components between the registered image RIM and the matching image RIM are eliminated. For this reason, only the parallel movement component remains as the difference between the registered image AIM and the corrected matching image RIM.

The parallel movement unit 23 detects the parallel movement component between the registered image AIM and the corrected matching image RIM mentioned above and the correlation value thereof. This detection is by the phase only correlation method using for example the phase only filter mentioned above. In more detail, the parallel movement unit 23 has Fourier transform units 2311 and 2312, a combining unit 232, a phase extraction unit 233, and an inverse Fourier transform unit 234.

The Fourier transform units 2311 and 2312, the combining unit 232, the phase extraction unit 233, and the inverse Fourier transform unit 234 have the same functions as those of the Fourier transform units 2120 and 2121, the combining unit 2122, the phase extraction unit 2123, and the inverse Fourier transform unit 2124 of the phase only correlation unit 212, so will be only simply explained.

The Fourier transform unit 2311 performs a Fourier transform on the registered image AIM and outputs the result to the combining unit 232. At this time, it is also possible to store the registered image AIM Fourier transformed at the Fourier transform unit 21111 in advance in the memory 12 and output the same to the combining unit 232. By doing this, the processing is reduced since double Fourier transform processing is not performed. The Fourier transform unit 2312 performs a Fourier transform on the corrected image S22 from the correction unit 22 and outputs the Fourier image as the processing result to the combining unit 232.

The combining unit 232 combines the Fourier images S2311 and S2312 output from the Fourier transform units 2311 and 2312 and outputs the combined image S232 to the phase extraction unit 233. The phase extraction unit 233 extracts the phase information as mentioned above based on the combined image S232 and outputs a signal S233 to the inverse Fourier transform unit 234. The inverse Fourier transform unit 234 performs an inverse Fourier transform based on the signal S233, generates a correlation strength image (correlation image data), and outputs it as a signal S23 to the matching unit 24.

The matching unit 24 matches the registered image AIM and the matching image RIM based on the signal S23 output from the parallel movement unit 23. For example, the matching unit 24 has a correlation value generation unit 241 and a judgment unit 242. The correlation value generation unit 241 generates a correlation value based on a correlation strength distribution in the signal S23 output from the parallel movement unit 23.

Figure 4:
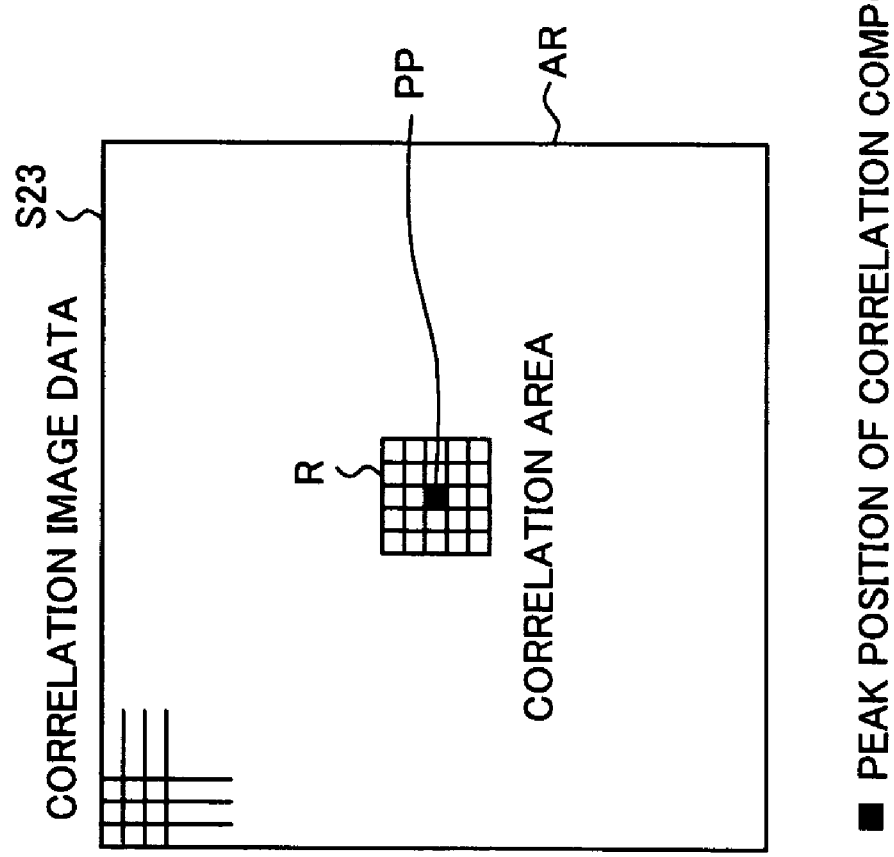
FIG. 4 is a view for explaining correlation value generation processing of a correlation value generation unit.

FIG. 4 is a view for explaining the correlation value generation processing of the correlation value generation unit 241. The correlation value image data of the signal S23 output from the parallel movement unit 23 has a sharp correlation peak PP at the center, for example, as shown in FIG. 4. The height of the correlation peak indicates the degree of similarity between the registered image AIM and the matching image RIM before the Fourier transform. For this reason, the correlation peak PP is used as the judgment reference of the matching of the images.

In more detail, the correlation value generation unit 241 defines for example a peripheral portion of the peak position as the correlation area R and generates a correlation value S241 based on a sum of the correlation values in the correlation area R and the sum of the correlation values in the entire area AR. For example, the correlation area R is an area of 5×5 pixels of the peripheral portion of the peak position PP as shown in FIG. 4.

The judgment unit 242 judges the matching of the images based on the correlation value S241 generated by the correlation value generation unit 241 and outputs data S242 indicating the result of the judgment. For example, the judgment unit 242 compares it with a threshold value determined in advance. When the correlation value S241 is larger than the threshold value, it judges that the registered image AIM and the matching image RIM coincide, while when it is smaller than the threshold value, it judges they do not coincide.

A detailed explanation of the processing for detection of the amount of parallel movement in the phase only correlation method will be given next. For example an original image f1(m,n), an original image f2(m,n), and an image f3(m,n)=f2(m+α,n+β) obtained by parallel movement of the image f2(m, n) are Fourier transformed to generate Fourier coefficients F1(u,v), F2(u,v), and F3(u,v) as shown in Equations (17) to (19):

$$F1(u, v) = \sum_{m=0}^{N-1} \sum_{n=0}^{N-1} f1(m, n)e^{-j2\pi((mu+nv)/N)} = A(u, v)e^{j\Theta(u,v)} \quad (17)$$

$$F2(u, v) = \sum_{m=0}^{N-1} \sum_{n=0}^{N-1} f2(m, n)e^{-j2\pi((mu+nv)/N)} = B(u, v)e^{j\phi(u,v)} \quad (18)$$

$$F3(u, v) = \sum_{m=0}^{N-1} \sum_{n=0}^{N-1} f2(m + \alpha, n + \beta)e^{-j2\pi((mu+nv)/N)} \quad (19)$$

-continued
$$= B(u, v)e^{j(\phi(u,v)+2\pi(\alpha u+\beta v)/N)}$$

Based on the Fourier coefficients F1(u,v) to F3(u,v), as shown in Equations (20) to (22), the phase images F'1(u,v) to F'3(u,v) of only the phase information are generated.

$$F'1(u,v)=e^{j\Theta(u,v)} \quad (20)$$

$$F'2(u,v)=e^{j\phi(u,v)} \quad (21)$$

$$F'3(u,v)=e^{j(\phi(u,v)+2\pi(\alpha u+\beta v)/N)} \quad (22)$$

A phase Z12(u,v) of the phase image of the correlation between the phase image F'1(u,v) and the phase image F'2(u, v) is calculated as shown in Equation (23), while a correlation Z13(u,v) of the phase image of the correlation between the phase image F'1(u,v), and the phase image F'3(u,v) is calculated as shown in Equation (24):

$$Z12(u,v)=F'1(u,v)(F'2(u,v))^*=e^{j(\Theta(u,v)-\phi(u,v))} \quad (23)$$

$$Z13(u,v)=F'1(u,v)(F'3(u,v))^*=e^{j(\Theta(u,v)-\phi(u,v)-2\pi(\alpha u+\beta v)/N)} \quad (24)$$

A correlation strength image G12(r,s) of the correlation Z12 and a correlation strength image G13(r,s) of the correlation Z13 are calculated as shown in Equations (25) and (26):

$$G12(r, s) = \sum_{u=0}^{N-1} \sum_{v=0}^{N-1} (Z12(u, v))e^{j2\pi((ur+vs)/N)} \quad (25)$$

$$= \sum_{u=0}^{N-1} \sum_{v=0}^{N-1} (e^{j(\theta(u,v)-\phi(u,v))})e^{j2\pi((ur+vs)/N)}$$

$$G13(r, s) = \sum_{u=0}^{N-1} \sum_{v=0}^{N-1} (Z13(u, v))e^{j2\pi((ur+vs)/N)} \quad (26)$$

$$= \sum_{u=0}^{N-1} \sum_{v=0}^{N-1} (e^{j(\theta(u,v)-\phi(u,v)-2\pi(\alpha u+\beta v/N)})e^{j2\pi((ur+vs)/N)}$$

$$= G12(r-\alpha, s-\beta)$$

As shown in Equations (25) and (26), when the image f3(m,n) is deviated by exactly (+α,+β) in comparison with the image f2(m,n), with the phase only correlation method, the peak of the correlation strength is generated at the position deviated by exactly (−α,−β) in the correlation strength image. From the position of this correlation strength position, the amount of parallel movement between two images can be found. Further, by using this phase only correlation method in the Fourier-Mellin space, the amount of parallel movement in the Fourier-Mellin space can be detected. This amount of parallel movement corresponds to the scalar information and the rotation angle information in real space as mentioned above.

Figure 5:
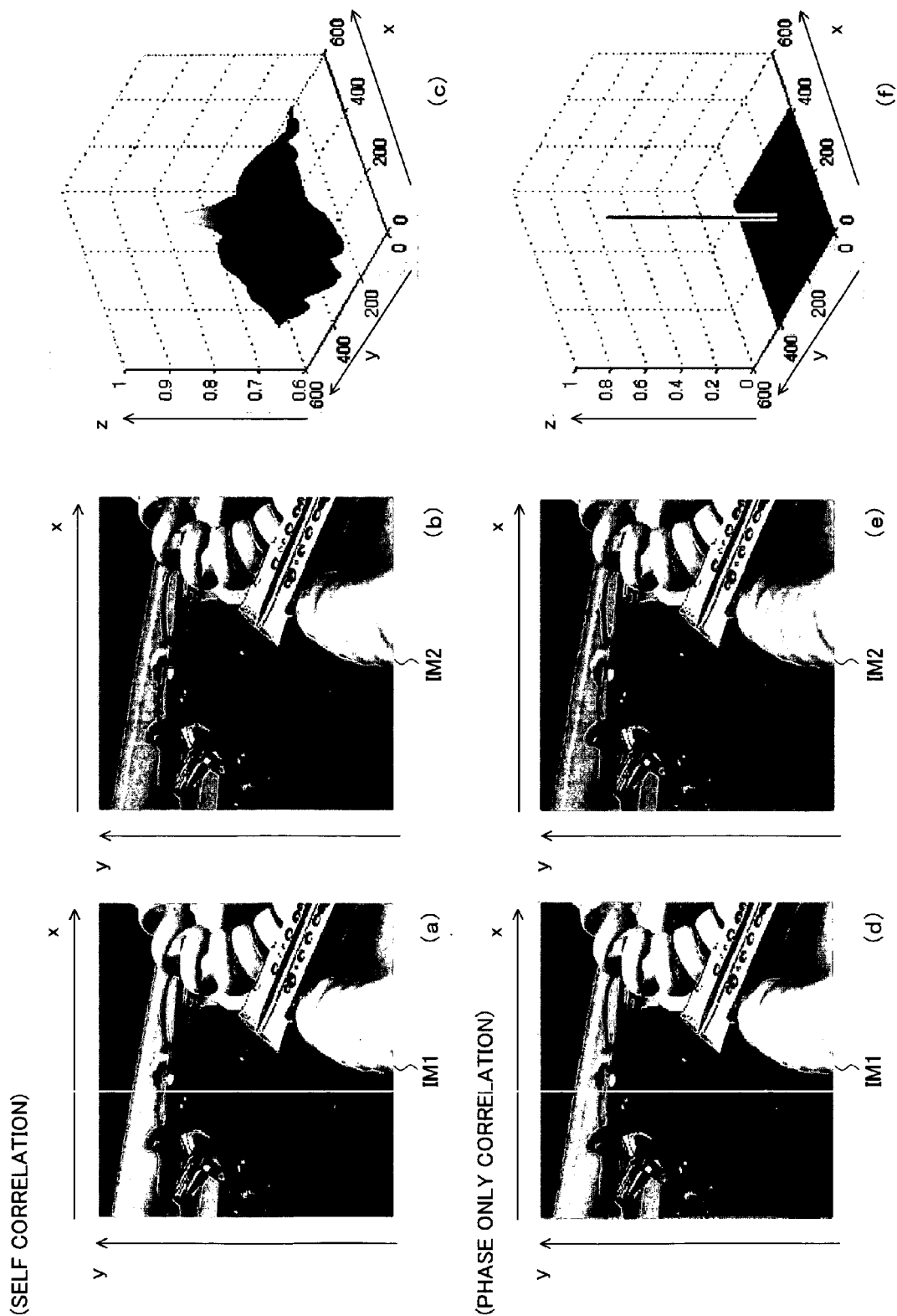
FIGS. 5A to 5F are views for explaining a difference between a self correlation method and a phase only correlation method.

FIGS. 5A to 5F are views for explaining a difference between the self correlation method and the phase only correlation method. In the self correlation method, as shown in for example FIGS. 5A and 5B, when the image IM1 and the image IM2 the same as the image IM1 are subjected to Fourier transforms to generate the self correlation function SG1, as shown in FIG. 5C, a correlation strength distribution having a peak of high correlation strength and a small correlation strength in the peripheral portion thereof is obtained. In FIG. 5C, the ordinate indicates the correlation strength.

On the other hand, in the phase only correlation method, as shown in FIGS. 5D and 5E, when the image IM1 and the image IM2 the same as the image IM1 are subjected to Fourier transforms to finding correlation for only the phase information, as shown in FIG. 5F, a correlation strength distribution having only a sharp peak having a high correlation strength is obtained. In this way, clear information concerning the correlation in comparison with the self correlation method can be obtained in by phase only correlation method. In FIG. 5F, the ordinate (z axis) indicates the correlation strength, and an x axis and a y axis indicate the amount of deviation.

FIGS. 6A to 6C are views for explaining the correlation strength distribution of a case where there is deviation in parallel movement between two images in the phase only correlation method. For example, the correlation strength distribution in the phrase only correlation method of the image IM1 and the image IM3 obtained by parallel movement by several pixels from the image IM1 as shown in FIGS. 6A and 6B is formed so that the sharp peak which has a high correlation strength is located at a position deviated from the peak position in the correlation image data shown in FIG. 5F by exactly the amount of parallel movement as shown in for example FIG. 6C. However, the peak strength shown in FIG. 6C is smaller in comparison with the peak strength shown in FIG. 5F. This is because the pixel area where the images IM1 and IM3 coincide is smaller than the images IM1 and IM2.

FIGS. 7A to 7C are views for explaining a correlation strength distribution when there is rotation deviation between two images in the phase only correlation method. In the correlation strength distribution in the phase only correlation method of the image IM1 and the image 4 rotated by several degrees from the image IM1 as shown in FIGS. 7A and 7B, for example, as shown in FIG. 7C, a correlation strength distribution having a weak correlation strength is obtained. When the phase only correlation method is simply used, due to the rotation deviation, it is difficult to detect correlation.

For this reason, the image matching system 1 according to the present embodiment performs Fourier-Mellin transforms on the registered image AIM and the matching image RIM and uses the phase only correlation method in the Fourier-Mellin space so as to detect the amount of parallel movement and detect the scalar information and the rotation angle information of the registered image AIM and the matching image RIM. Based on the information, the scaling and the rotation angle of the matching image are corrected. The deviation of parallel movement between the corrected matching image RIM and registered image AIM is detected by the phase only correlation method. The matching of images is simultaneously carried out based on the correlation value peak.

Figure 8:
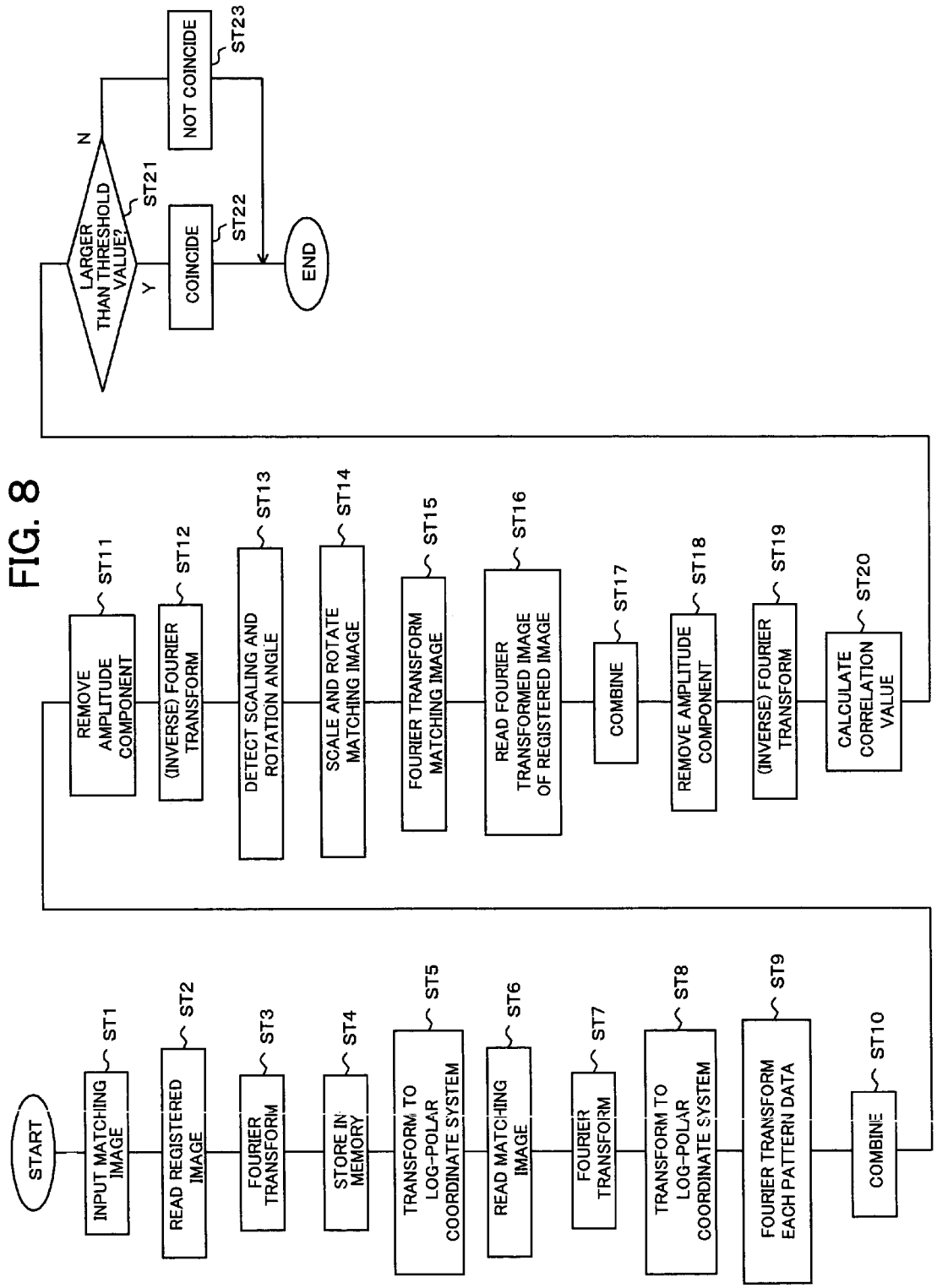
FIG. 8 is a flow chart for explaining the operation of the image matching system shown in FIG. 1.

FIG. 8 is a flow chart for explaining the operation of the image matching system 1 shown in FIG. 1. The operation of the image matching system 1 having a configuration explained above will be simply explained with reference to FIG. 8. For example, the image input unit 11 inputs the registered image AIM and the matching image RIM and stores the image data in the memory (ST1). Here, in order to find the scalar information (scaling) and the rotation angle information of the matching image RIM with respect to the registered image AIM, the registered image AIM is read from the memory 12 (ST2). The Fourier transform unit 21111 of the scalar information-rotation information unit 21 performs the Fourier transform processing (ST3), then the Fourier image data S21111 is stored in the memory 12 (ST4). The amplitude component in the Fourier image data S21111 is subjected to log processing by the log transform unit 21121, then the log-polar coordinate transform unit 21131 transforms this to the log-polar coordinate system (ST5).

The matching image RIM is read out from the memory 12 (ST6) and processed by Fourier transform by the Fourier transform unit 21112 in the same way as above (ST7). The amplitude component in the Fourier image data S21112 is subjected to log processing by the log transform unit 21112 and is transformed to the log-polar coordinate system by the log-polar coordinate transform unit 21132 (ST8).

The image signals (also referred to as the pattern data) SA211 and SR211 obtained as the result of the Fourier-Mellin transforms on the registered image AIM and the matching image RIM are Fourier transformed by the Fourier transform units 2120 and 2121 of the phase only correlation unit 212 (ST9), and combined by the combining unit 2122 (ST10). The amplitude component is removed from the combined signal by the phase extraction unit 2123 (ST11). The remaining phase component is subjected to inverse Fourier transform processing by the inverse Fourier transform unit 2124 (ST12). Based on the amount of deviation of the peak position of the obtained correlation image data from the image center, correction information including scalar information and rotation information is generated by the scalar information rotation information generation unit 213 (ST13).

The correction unit 22 performs processing for correction of scaling and rotation of the matching image based on the correction information and eliminates the scaling component and the rotation component between the images (ST14). The remaining difference is only the parallel movement component and is detected by using the phase only correlation method.

The corrected matching image RIM is Fourier transformed by the Fourier transform unit 2312 of the parallel movement unit 23 (ST15) to generate the Fourier image data S2312, the Fourier transformed registered image AIM stored in the memory 12 is read out (ST16), and combined data S232 is generated by the combining unit 232 (ST17). At this time, it is also possible to perform a Fourier transform on the registered image AIM by the Fourier transform unit 2311 to generate the Fourier image data 2311 and input it to the combining unit 232. The amplitude information in the combined data S232 is removed by the phase extraction unit 233 (ST18). The remaining phase information is input to the inverse Fourier transform unit 234 (ST19).

Based on the correlation image data S23 generated by the above processings, a value obtained by dividing the sum of the correlation values of for example 5×5 pixels in the vicinity of for example the peak position by the sum of all correlation values from the correlation value generation unit 241 is generated as the correlation value S241 (ST20). The judgment unit 242 judges whether or not the correlation value S241 is larger than a predetermined threshold value (ST21). When it is larger than the threshold value, it judges that the registered image AIM and the matching image RIM coincide (ST22), and predetermined processing is carried out by the operation processing unit 16. For example, when the image matching system 1 according to the present embodiment is used for a fingerprint matching system in the security field, processing for releasing an electronic lock is carried out.

On the other hand, at step ST21, when the judgment unit 242 judges that the correlation value S241 is smaller than the threshold value (ST23), it recognizes that the registered image AIM and the matching image RIM do not coincide and terminates the series of processing.

As explained above, in the present embodiment, since provision was made of the Fourier-Mellin transform unit 211 for performing Fourier transforms and log-polar coordinate Fourier transforms on the registered image AIM and the matching image RIM, the phase only correlation unit 212 and the scalar information-rotation information generation unit 213 for generating correction information including scalar information and rotation information based on the correlation strength of the phase information based on the transform result, the correction unit 22 for correcting the matching image RIM in accordance with the image information based on the correction information, the parallel movement unit 23 for performing phase only correlation processing based on the image of the result of the correction processing and the registered image, the correlation value generation unit 241 for generating a correlation value based on the correlation image data generated by the phase only correlation processing, and the judgment unit 242 for performing processing for judgment concerning matching based on the correlation value, even if there are differences in the amount of parallel movement, the rotation angle, and the scaling between the images, matching can be carried out.

That is, by performing the log transform processing on the Fourier image, performing a log-polar coordinate transform, and performing the phase only correlation processing in the Fourier-Mellin coordinate system, even if there are differences in the amount of parallel movement, the rotation angle, and the scaling between the images, matching can be carried out.

FIGS. 9A to 9F are views for explaining a general polar coordinate transform when fingerprint images are utilized as the registered image and the matching image. For example, the fingerprint registered image AIM shown in FIG. 9A and the fingerprint matching image RIM shown in FIG. 9B smaller than the fingerprint registered image AIM and having deviation in rotation angle are subjected to Fourier transform processing to generate Fourier images IM11 and IM12 shown in FIGS. 9C and 9D. When the polar coordinate transform is simply carried out without performing a log transform, images IM111 and IM121 are generated for example as shown in FIGS. 9E and 9F. In the images IM111 and IM121, however, the radius vector direction r cannot be judged.

Figure 10:
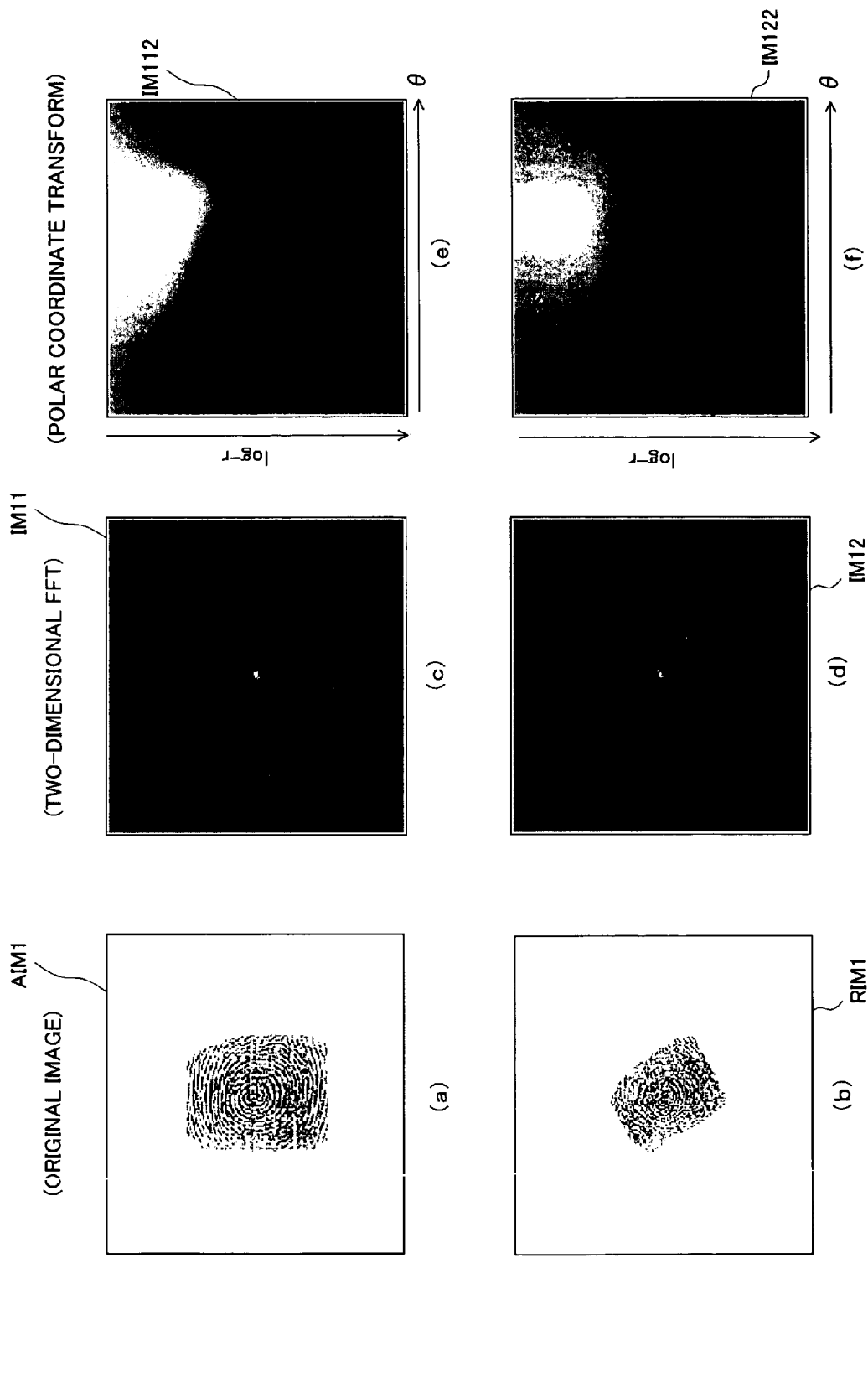
FIGS. 10A to 10F are views for explaining a Fourier-Mellin transform in the case of fingerprint images as the registered image and the matching image.

FIGS. 10A to 10F are views for explaining the Fourier-Mellin transform in the case of fingerprint images as the registered image and the matching image. For example, the fingerprint registered image AIM shown in FIG. 10A and the fingerprint matching image RIM shown in FIG. 10B smaller than the fingerprint registered image AIM and having deviation in rotation angle are subjected to Fourier transform processing to generate the Fourier images IM11 and IM12 shown in FIGS. 10C and 10D. When log transforms are carried out and log-polar coordinate transforms are carried out, images IM112 and IM122 are generated for example as shown in FIGS. 10E and 10F. In the images IM112 and IM122, high frequency components are emphasized in log-r direction, therefore correlation between images can be easily found.

Figure 11:
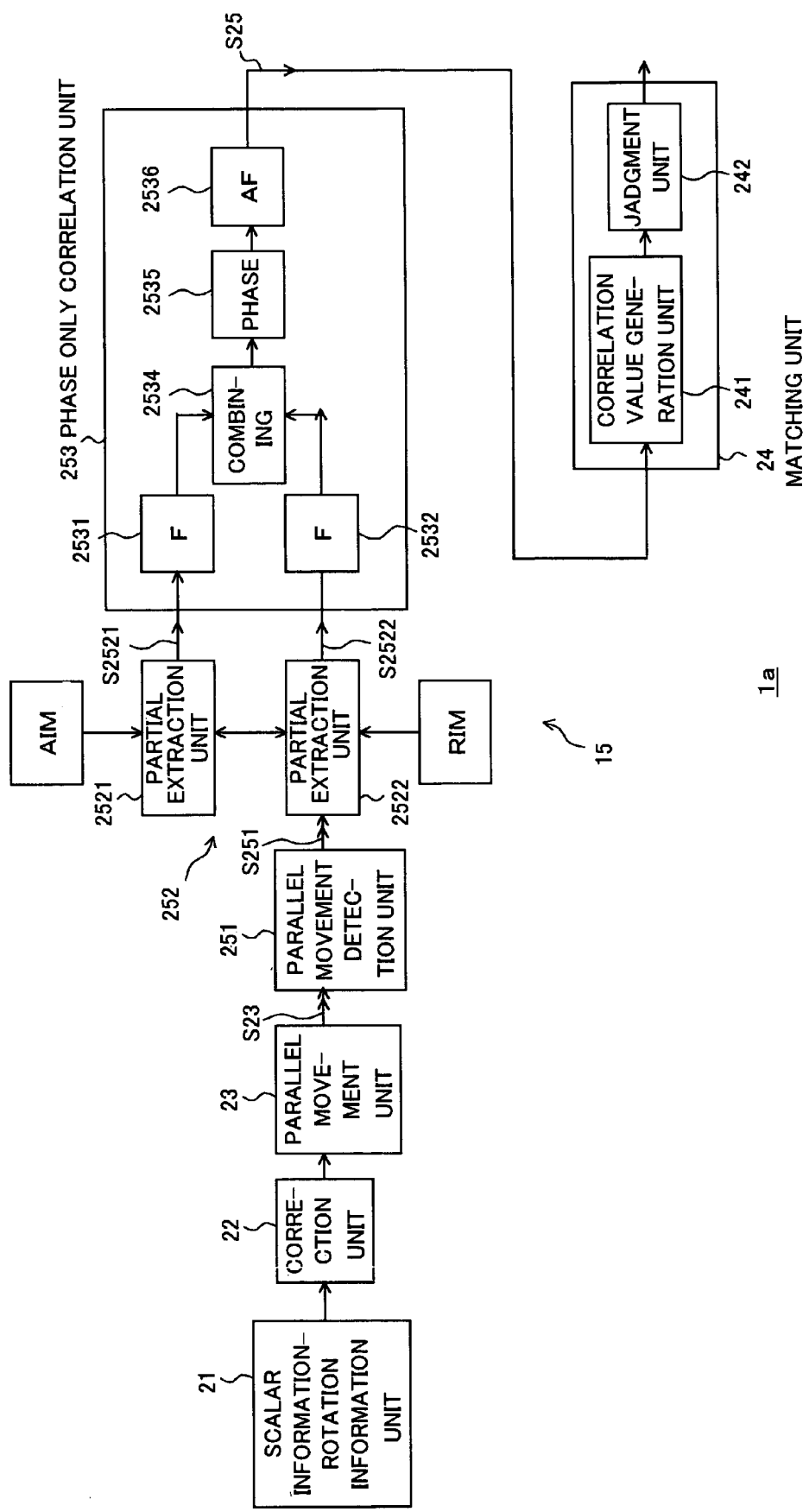
FIG. 11 is a functional block diagram of an image matching system according to a second embodiment of the present invention.

FIG. 11 is a functional block diagram of an image matching system according to a second embodiment of the present invention. An image matching system 1a according to the present embodiment detects positional deviation of the registered image AIM and the matching image RIM, corrects the positional deviation based on the detection result, then extracts the common partial areas of the two images, finds the correlation of each of the extracted common partial areas, and performs matching based on the correlation results.

The image matching system 1a has the same configuration as the image matching system 1 according to the first embodiment in terms of hardware. The software-like difference between the image matching system 1a and the image matching system 1 according to the first embodiment resides in that, as shown in FIG. 11, a parallel movement detection unit 251, a common partial area extraction unit 252, and a phase only correlation unit 253 are provided. The rest of the components are given the same reference numerals and explanations thereof are omitted.

The parallel movement detection unit 251 detects the amount of parallel movement based on the signal S23 indicating the correlation strength image output from the parallel movement unit 223 in FIG. 11 and outputs the same to the partial extraction unit 2522. The amount of parallel movement is obtained by detecting the amount of deviation of the peak position from the image center in the correlation strength image. This amount of deviation is equivalent to the amount of deviation concerning parallel movement between the registered image AIM and the matching image RIM.

The common partial area extraction unit 252 has a partial extraction unit 2521 and a partial extraction unit 2522. The partial extraction unit 2521 extracts a partial pixel area set in advance from the interior of the registered image AIM and outputs the same as the signal S2521 to the Fourier transform unit 2531 as shown in FIG. 11.

The partial extraction unit 2522 extracts a common partial pixel area corresponding to the partial pixel area of the above registered image AIM from the interior of the matching image RIM based on the signal S251 output from the parallel movement detection unit 251 and outputs the same as the signal S2522 to the Fourier transform unit 2532.

The phase only correlation unit 253 finds correlation by the phase only correlation method, generates the correlation image data S253 in the common partial area, and outputs it to the matching unit 24. In more detail, for example the phase only correlation unit 253 has Fourier transform units 2531 and 2532, a combining unit 2534, a phase extraction unit 2535, and an inverse Fourier transform unit 2536. The components have functions the same as those of the phase only correlation unit 212 mentioned above, so explanations will be omitted.

Figure 12:
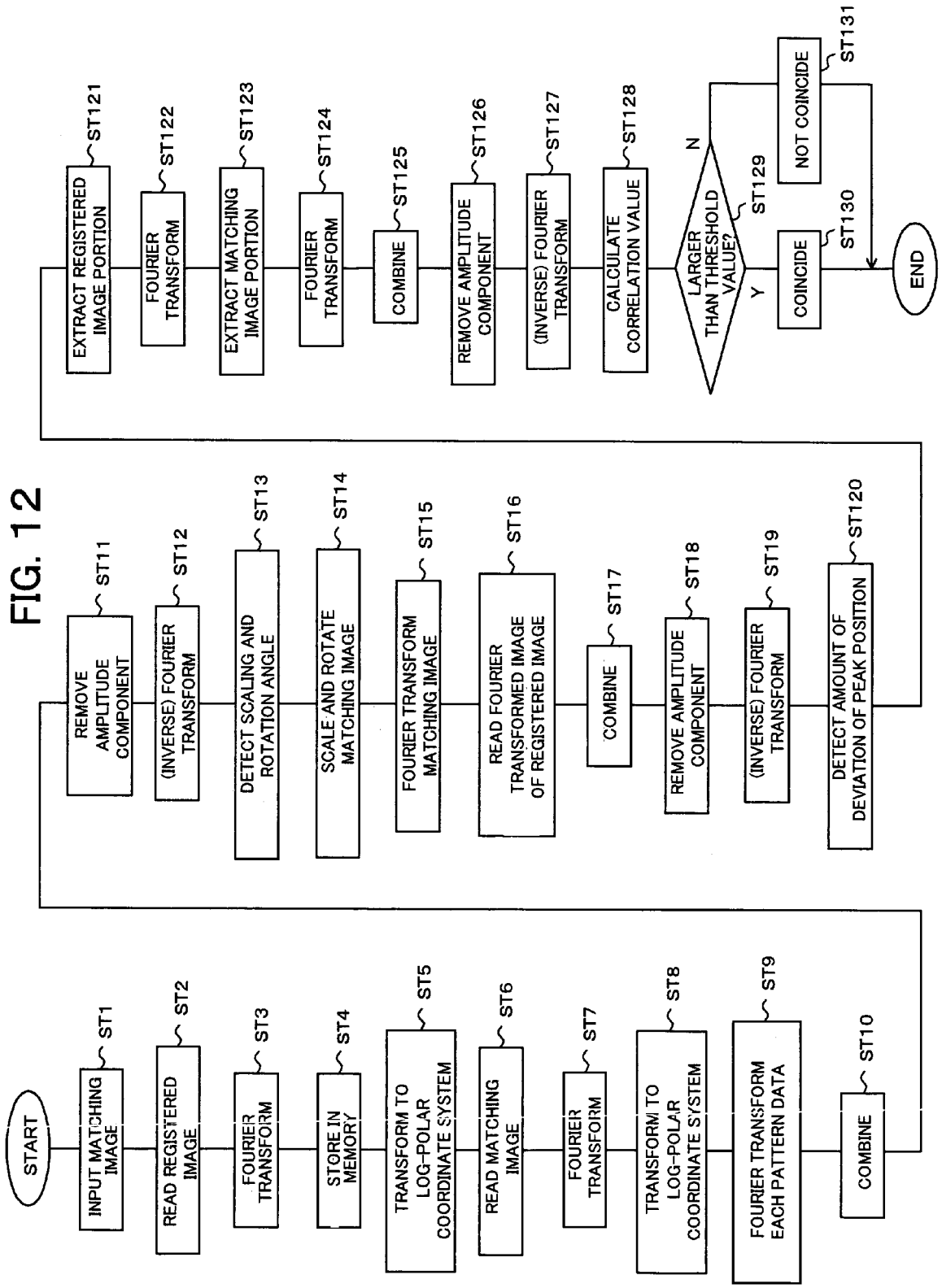
FIG. 12 is a flow chart for explaining the operation of the image matching system according to the second embodiment shown in FIG. 11.

FIG. 12 is a flow chart for explaining the operation of the image matching system according to the second embodiment shown in FIG. 11. Only the difference of the operation of the image matching system 1a will be explained with reference to FIG. 12. The processing of steps ST1 to ST19 is the same as in the operation of the image matching system 1 according to the first embodiment. At step ST120, an amount of parallel movement S251 is detected from the signal S23 indicating the correlation strength image generated at the inverse Fourier transform unit 234 at step ST19 by the parallel movement detection unit 251.

At step ST121, the partial extraction unit 2521 extracts the partial area set in advance from the registered image AIM. This partial area is Fourier transformed by the Fourier transform unit 2531 (ST122). The partial extraction unit 2522 extracts the common partial area corresponding to the partial area of the above registered image AIM from the matching image RIM based on the amount of parallel movement S251 (ST123). Fourier transform processing is then carried out by the Fourier transform unit 2532 (ST124).

The images of the Fourier transformed partial areas are combined by the combining unit 2534 to generate the combined Fourier image data (ST125), the amplitude component is eliminated by the phase extraction unit 2535, then the remaining phase component is extracted (ST126), and inverse Fourier transform processing is carried out by the inverse Fourier transform unit 2536 (ST127), whereby the correlation image data S253 is generated.

At step ST128, the correlation value generation unit 241 generates a correlation value in accordance with the correlation image data S253. The judgment unit 242 judges whether or not the correlation value S241 is larger than a predetermined threshold value (ST129). When it is larger than the threshold value, it judges that the registered image AIM and the matching image RIM coincide (ST130), and the operation processing unit 16 performs the predetermined processing. On the other hand, when the judgment unit 242 judges at step ST129 that the correlation value S241 is smaller than the threshold value (ST131), it judges that the registered image AIM and the matching image RIM do not coincide and terminates the series of processing.

As mentioned above, in the present embodiment, since the positional deviation between the registered image AIM and the matching image. RIM is detected, the common pixel areas of each are extracted, and the correlation between the common pixel areas is found, in comparison with the case where the correlation is found between the pixel areas of the entire images in for example the first embodiment, a reduction of the correlation peak strength by the non-common portions of the two images can be avoided and the matching precision can be raised.

Further, in the present embodiment, partial pixel areas set in advance were extracted when extracting the common areas, but the invention is not limited to this format. For example, it is also possible to select the areas so that the common areas of the two images become the maximum based on the amount of positional deviation between the registered image AIM and the matching image RIM and find the correlation strength of the extracted areas. By doing this, the correlation peak strength can be made higher and the precision of matching can be raised.

Figure 13:
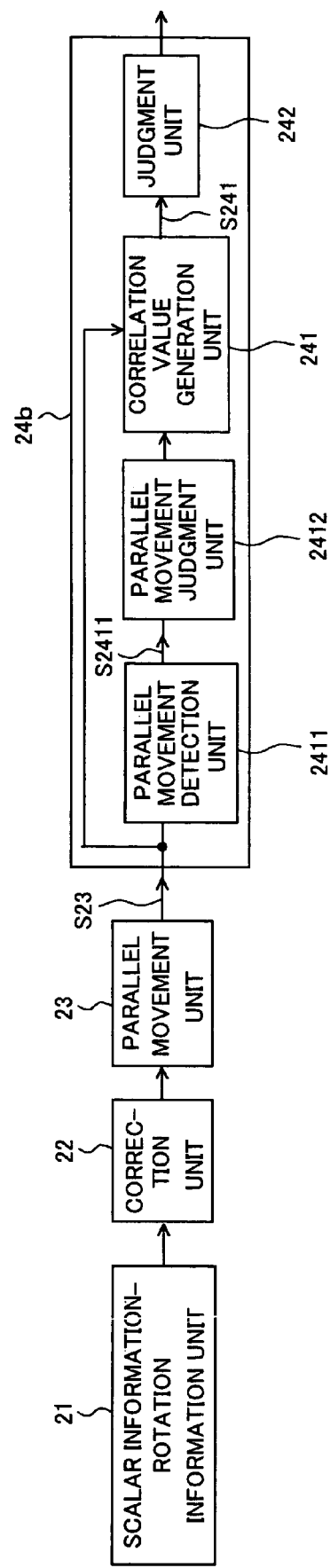
FIG. 13 is a functional block diagram of an image matching system according to a third embodiment of the present invention.

FIG. 13 is a functional block diagram of an image matching system according to a third embodiment of the present invention. An image matching system 1b according to the present embodiment performs-processing for correction of scaling and rotation of the registered image AIM and the matching image RIM, then, when there is an amount of deviation of parallel movement between the two images within a range set in advance, executes correlation value generation processing. It does not generate a correlation value when the amount of deviation of parallel movement is out of the range. The difference between the image matching system 1b and the image matching system 1 according to the first embodiment resides in a matching unit 24b. The rest of the components are the same, so explanations will be omitted. The matching unit 24b has, as shown in FIG. 13, a parallel movement detection unit 2411, a parallel movement judgment unit 2412, a correlation value generation unit 241, and a judgment unit 242.

Figure 14:
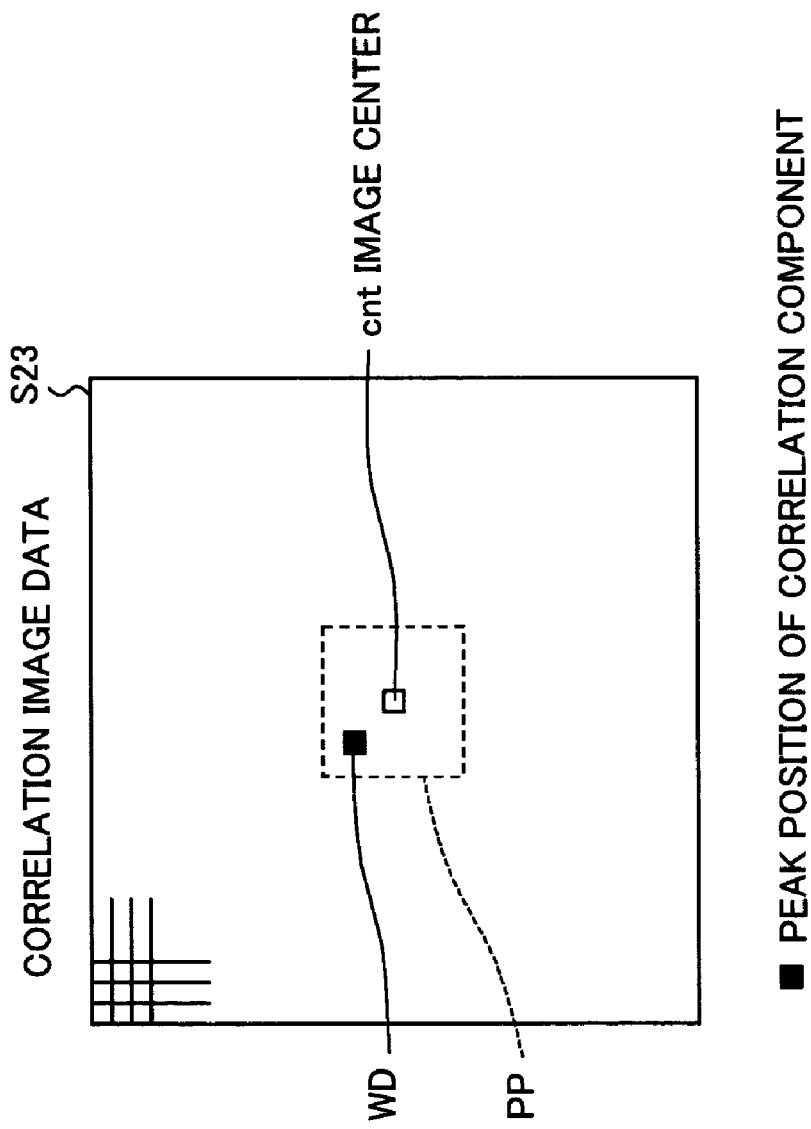
FIG. 14 is a view for explaining the operation of detecting an amount of parallel movement by a parallel movement detection unit.

FIG. 14 is a view for explaining the operation of detecting the amount of parallel movement of the parallel movement detection unit. The parallel movement detection unit 2411 detects the amount of parallel movement S2411 based on the signal S23 indicating the correlation image data output from the parallel movement unit 23. The parallel movement detection unit 2411 detects, for example, as shown in FIG. 14, the amount of deviation of the correlation peak position PP from the center position "cnt" based on the correlation image data S23. In FIG. 14, the peak position PP is indicated by a black square, and the center positions "cnt" is indicated by a white square. The amount of deviation from the center position "cnt" is equivalent to the amount of parallel movement between the registered image AIM and the matching image RIM.

The parallel movement judgment unit 2412 judges that the registered image AIM and the matching image RIM do not coincide when the amount of deviation (amount of parallel movement) S2411 is larger than a threshold value set in advance based on the amount of deviation (amount of parallel movement) S2411 detected by the parallel movement detection unit 2411. In more detail, the parallel movement judgment unit 2412 judges whether or not the peak position PP is located in the window WD surrounding the center position "cnt" in advance in the correlation image data S23 as shown in FIG. 14. This window WD corresponds to the threshold value concerning the amount of parallel movement mentioned above.

The correlation value generation unit 241 generates a correlation value S241 based on the correlation peak strength when it is judged by the parallel movement judgment unit 2412 that the correlation peak position PP exists in this window WD. The judgment unit 242 judges the matching of the images based on the correlation value S241 generated by the correlation value generation unit 241 and outputs data S242 indicating the result of the judgment. For example, the judgment unit 242 compares it with a threshold value set in advance and judges that the registered image AIM and the matching image RIM coincide when the correlation value S241 is larger than the threshold value, while judges that they do not coincide when the correlation value S241 is smaller than the threshold value.

FIG. 15 is a flow chart for explaining the operation of the image matching system shown in FIG. 14. The operation of the image matching system 1b will be simply explained with reference to FIG. 15.

The processing up to step ST19 is the same as the operation of the image matching system 1 according to the first embodiment, so the explanation thereof will be omitted. At step ST220, the amount of parallel movement S2411 is detected from the signal S23 indicating the correlation strength image generated at the inverse Fourier transform unit 234 at step ST19 by the parallel movement detection unit 2411. At step ST221, the parallel movement judgment unit 2412 judges whether or not the peak position PP is located within the window WD surrounding the center position "cnt" set in advance based on the amount of parallel movement S2411.

When the parallel movement detection unit 2411 judges that the peak position PP is located in the window WD, the correlation value generation unit 241 generates the value obtained by dividing the sum of the correlation values in the correlation area comprised by 5×5 pixels in the vicinity of for example the peak position by the sum of the correlation values of the entire area as the correlation value of the two images as mentioned above based on the correlation strength image S23 (ST222).

At step ST223, the judgment unit 242 judges whether or not the correlation value S241 generated by the correlation value generation unit 241 is larger than a predetermined threshold value. When it is larger than the threshold value, it judges that the registered image AIM and the matching image RIM coincide (ST224). On the other hand, at step ST223, when the correlation value S241 is smaller than the threshold value, and at step ST221, when the parallel movement detection unit 2411 judges that the peak position PP is not located in the window WD, it judges that the two images do not coincide (ST225) and terminates the series of processings.

As explained above, in the present embodiment, since provision was made of the parallel movement detection unit 2411 for detecting the amount of parallel movement based on the correlation image data S23, the parallel movement judgment unit 2412 for judging whether or not the amount of parallel movement is within a threshold value based on the detected amount of parallel movement, the correlation value generation unit 241 for generating a correlation value based on the correlation peak strength when the amount of parallel movement is within the threshold value, and the judgment unit 242 for matching two images based on the correlation value, when there is no correlation between the images at all, the correlation peak PP of the correlation image data is rarely located near the image center. Accordingly, when the correlation peak position PP is out of the predetermined window WD based on the correlation image data, the following processings such as the correlation value generation processing are not carried out, so the processing load can be reduced.

Further, since the image matching system 1b performs matching when the correlation strength peak is located inside the predetermined area including the center position "cnt" in the correlation image data and the peak strength is larger than a predetermined threshold value, the matching precision can be made higher than that of the image matching system of the first embodiment.

Figure 16:
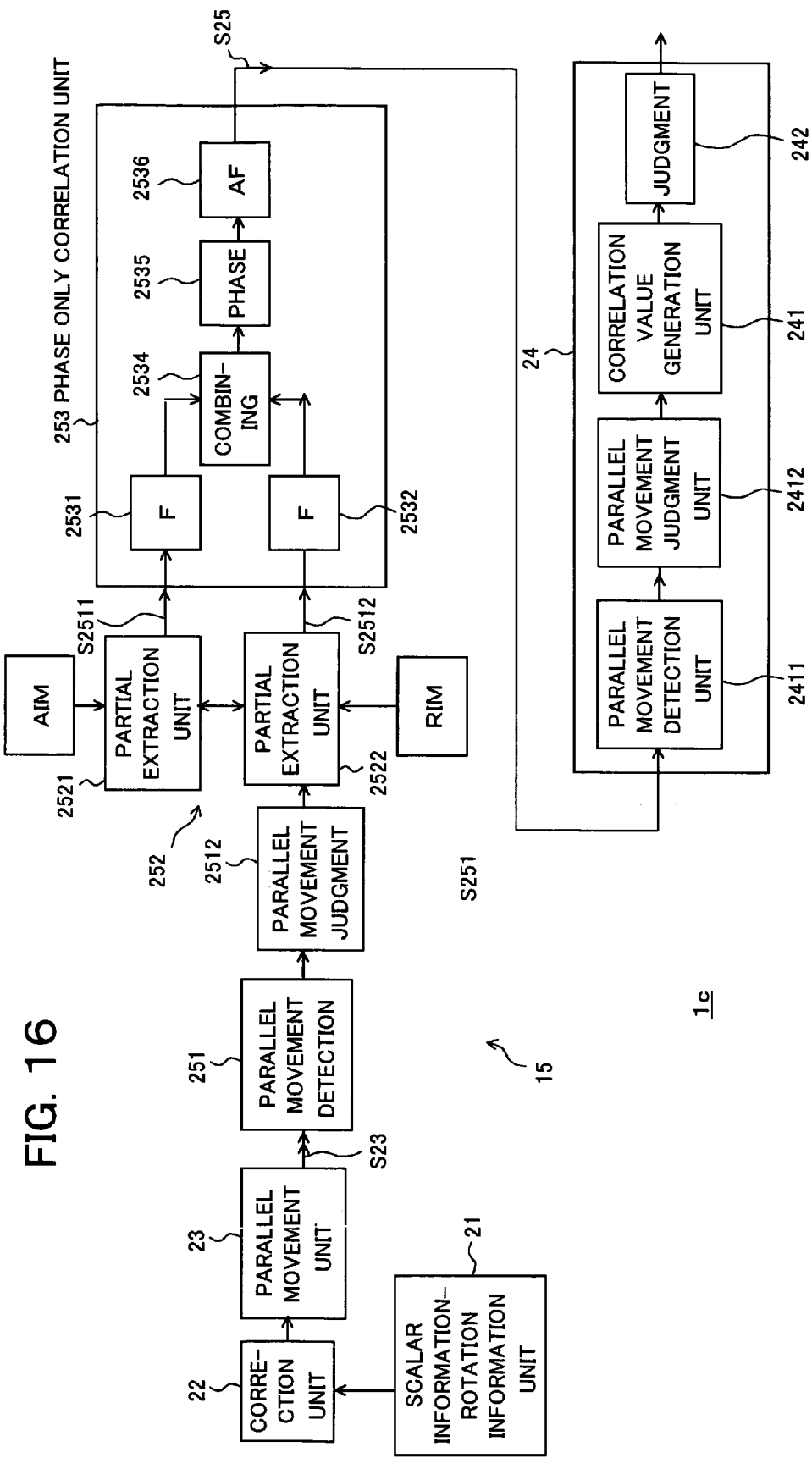
FIG. 16 is a view of part of the functional blocks of an image matching system according to a fourth embodiment of the present invention.

FIG. 16 is a view of part of the functional blocks of an image matching system according to a fourth embodiment the present invention. An image matching system 1c according to the present embodiment has a function of performing processing when the amount of parallel movement is within a predetermined threshold value of the image matching system 1b of the third embodiment and a function of extracting the common partial areas of the image matching system 1a of the second embodiment.

A CPU 15c according to the present embodiment has a scalar information-rotation information unit 21, a correction unit 22, a parallel movement unit 23, a parallel movement detection unit 251, a parallel movement judgment unit 2512, a common partial area extraction unit 252, a phase only correlation unit 253, and a matching unit 24. The scalar information-rotation information unit 21, the correction unit 22, and the parallel movement unit 23 have the same functions as those of the image matching system 1 according to the first embodiment, so are not illustrated.

In FIG. 16, the parallel movement detection unit 251 and the parallel movement judgment unit 2512 have the same functions as those of the parallel movement detection unit 2411 and the parallel movement judgment unit 2412 of the image matching system 1b according to the third embodiment.

The parallel movement detection unit 251 detects the amount of parallel movement based on the correlation peak position in the correlation strength image data S23 output from the parallel movement unit 23. The parallel movement judgment unit 2512 judges whether or not the amount of parallel movement is within a predetermined threshold value, in more detail, whether or not the correlation peak position is located in the predetermined window WD based on the amount of parallel movement detected at the parallel movement unit 23, and judges that the two images do not coincide when the amount of parallel movement is larger than the predetermined threshold value.

Further, in FIG. 16, the common partial area extraction unit 252 and the phase only correlation unit 253 have substantially the same functions as those of the common partial area extraction unit and the phase only correlation unit of the image matching system 1a according to the second embodiment. The difference resides in that the common partial area extraction unit 252 extracts the common partial pixel areas from the registered image AIM and the matching image RIM when it is judged at the parallel movement judgment unit 2512 that the amount of parallel movement is within a predetermined threshold value.

The matching unit 24 has, as shown in FIG. 16, a parallel movement detection unit 2411, a parallel movement judgment unit 2412, a correlation value generation unit 241, and a judgment unit 242. The matching unit 24 is substantially the same as the matching unit 24 of the image matching system 1c according to the third embodiment. The difference resides in the point that processing s carried out for matching for the common partial areas.

Figure 17:
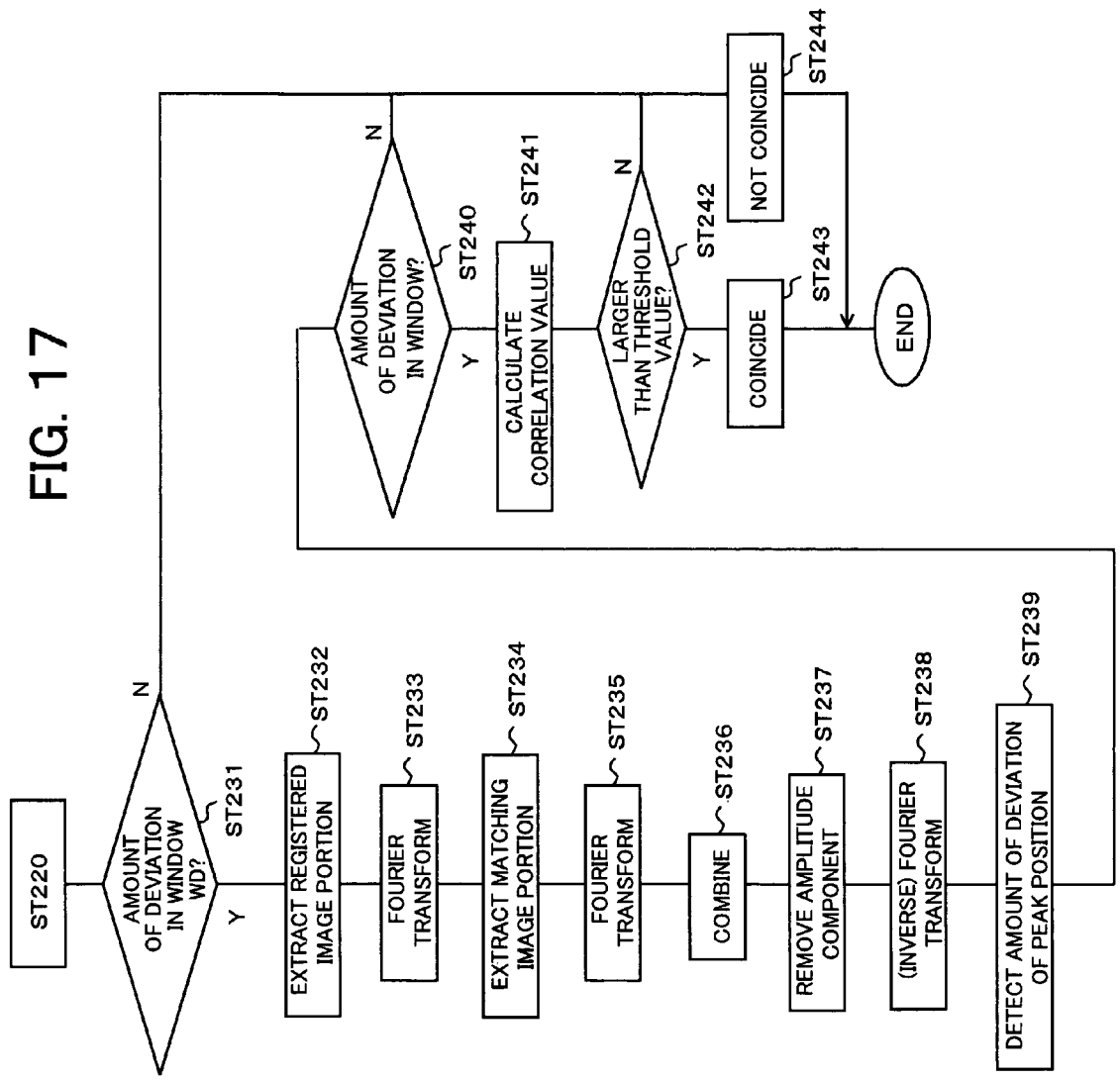
FIG. 17 is a flow chart for explaining the operation of the image matching system according to the fourth embodiment.

FIG. 17 is a flow chart for explaining the operation of the image matching system 1c according to a fourth embodiment. Only the difference of the operation of the image matching system 1c from the image matching system 1b according to the third embodiment will be explained with reference to FIG. 17.

The processings of steps ST1 to ST19 and up to ST220 are the same as in the operation of the image matching system 1b according to the third embodiment shown in FIG. 15, so the explanations will be omitted. At step ST220, the amount of parallel movement S251 is detected from the signal S23 indicating the correlation strength image generated at the inverse Fourier transform unit 234 at step ST19 by the parallel movement detection unit 251. At step ST231, the parallel movement judgment unit 2512 judges whether or not the peak position PP is located within the window WD surrounding the center position "cnt" set in advance based on the amount of parallel movement S251 (ST231).

When the amount of parallel movement judgment unit 251 judges at step ST231 that the peak position P is located within the window WD, the partial extraction unit 2521 extracts the partial area set in advance from the registered image AIM (ST232). This partial area is Fourier transformed by the Fourier transform unit 2531 (ST233). The partial extraction unit 2522 extracts the common partial area corresponding to the partial area of the registered image AIM from the matching image RIM based on the amount of parallel movement S251 (ST234), and the Fourier transform unit 2532 performs Fourier transform processing (ST235).

The Fourier transformed images of the partial areas are combined by the combining unit 2534 to generate the combined Fourier image data (ST256). The amplitude component is removed by the phase extraction unit 2535, then the remaining phase component is extracted (ST237). The result is subjected to the inverse Fourier transform processing by the inverse Fourier transform unit 2536 to generate the correlation image data S253 (ST238).

At step ST239, the parallel movement detection unit 2411 detects the amount of parallel movement S2411 of the common partial pixel areas. The parallel movement judgment unit 2412 judges whether or not the peak position PP is located within the window WD surrounding the center position "cnt" set in advance based on the amount of parallel movement S2411 (ST240). When it is judged that the peak position PP is located in the window WD, the correlation value generation unit 241 generates a value obtained by dividing the sum of the correlation values in the correlation area comprised by 5×5 pixels in the vicinity of for example the peak position by the sum of the correlation values of the common partial area as mentioned above based on the correlation strength image S25 (ST241).

The judgment unit 242 judges whether or not the correlation value S241 is a predetermined threshold value or more (ST242). When it is larger than the threshold value, it judges that the registered image AIM and the matching image RIM coincide (ST243), and the operation processing unit 16 performs the predetermined processing. On the other hand, when the judgment unit 242 judges at step ST242 that the correlation value S241 is smaller than the threshold value and when it is judged at step ST2,40 that the peak position PP is not located in the window WD surrounding the center position "cnt" set in advance (ST244), the judgment unit 242 judges that the registered image AIM and the matching image RIM do not coincide and terminates the series of processing.

As explained above, since the image matching system 1c provides the function of performing processing when the amount of parallel movement is smaller than the threshold value of the image matching system 1b according to the third embodiment and the function of extracting the common partial areas of the image matching system 1a of the second embodiment, it can perform higher precise matching.

The image matching system 1c according to the fourth embodiment provides a first limitation that the amount of parallel movement concerning all areas be not more than a predetermined threshold value and a second limitation that the amount of parallel movement concerning the common partial pixel areas be not more than a predetermined threshold value, therefore can perform matching having a higher precision.

Further, it was provided with a parallel movement detection unit and a parallel movement judgment unit so as to perform the processing of the latter stages only in the case when the amount of parallel movement was smaller than the threshold value, therefore the processing load is reduced. Further, the processing time is shortened. Further, in comparison with the case of reliably calculating the correlation value every time, the rate of erroneous judgment due to the correlation value between images having no correlation exceeding the threshold value can be greatly reduced.

Note that the present invention is not limited to the present embodiments. Any modifications are possible. In the first embodiment, the Fourier transform processing, the log transform processing, and the log-polar coordinate transform were carried out, the amount of parallel movement in the Fourier-Mellin space was calculated, and the scalar information and the rotation angle information were calculated, but the present invention is not limited to this format. For example, it is also possible to perform the coordinate transform in a space able to detect the scalar information and the rotation angle information.

In the fourth embodiment, the predetermined threshold value of the first limitation and the predetermined threshold value of the second limitation were the same, in more detail, they were based on the same window WD, but the present invention is not limited to this. For example, it is also possible to narrow down the candidates for calculation of the correlation value by making the threshold value concerning the first limitation according to all areas larger to loosen the limitation and making the threshold value concerning the second limitation according to the partial area smaller.

Summarizing the effects of the invention, according to the present invention, an image matching system and an image matching method and program able to perform matching even when there are differences in the amount of parallel movement, the rotation angle, and scaling between images can be provided.

While the invention has been described with reference to specific embodiments chosen for purpose of illustration, it should be apparent that numerous modifications could be made thereto by those techniqued in the art without departing from the basic concept and scope of the invention.

I claim:

1. An image matching system for matching a first image and a second image, comprising:
a correction information generating means for performing a Fourier transform and a log-polar coordinate transform to said first image and said second image and generating correction information of said first image based on the results of said Fourier transform and log-polar coordinate transform; and
a matching means for performing processing of correction of said first image based on said correction information generated by said correction information generating means to generate a corrected first image, performing a correlation comparison between said corrected first image and said second image, and determining if the corrected first image matches the second image based on results of said correlation processing.

2. An image matching system as set forth in claim 1, wherein said correction information generating means performs a further Fourier transform based on the results of said log-polar coordinate transform of said first image and said second image and generates scalar information and/or rotation information as said correction information based on correlation strength of said Fourier transformed first image and second image, and said matching means generates said corrected first image based on said scalar information and/or said rotation information generated by said correction information generating means.

3. An image matching system as set forth in claim 2, wherein said correction information generating means generates said scalar information and/or rotation information as said correction information based on correlation strength of phase information of said Fourier transformed first image and second image.

4. An image matching system as set forth in claim 2, wherein said matching means generates said corrected first image based on said scalar information and/or said rotation information generated by said correction information generating means, performs processing for Fourier transforming said corrected first image and second image, and performs correlation comparison processing based on said Fourier transformed corrected first image and said Fourier transformed second image.

5. An image matching system as set forth in claim 2, wherein said matching means generates said corrected first image based on said scalar information and/or said rotation information generated by said correction information generating means, performs processing for Fourier transforming said corrected first image and second image, and performs correlation comparison processing based on phase information of said Fourier transformed corrected first image and said Fourier transformed second image.

6. An image matching system as set forth in claim 1, wherein said correction information generating means performs a Fourier-Mellin transform to said first image and said second image, performs a correlation comparison between said Fourier-Mellin transformed first image and second image, and generates said scalar information and/or rotation information as said correction information.

7. An image matching system as set forth in claim 1, wherein said matching means generates parallel movement information of said corrected first image and second image based on a peak position of correlation strength of phase information of said corrected first image and second image, extracts common areas of said first image and said second image based on said movement amount information, performs processing for correlation of said extracted common areas, and performs processing for matching said first image and said second image based on the results of said correlation processing.

8. An image matching system as set forth in claim 1, wherein said matching means generates parallel movement information of said corrected first image and second image based on a peak position of correlation strength of phase information of said corrected first image and second image and performs processing for matching said first image and said second image when said parallel movement information is smaller than a predetermined amount of parallel movement.

9. An image matching method for matching a first image and a second image, comprising:
performing a Fourier transform and a log-polar coordinate transform to said first image and said second image;
generating correction information of said first image based on the results of said Fourier transform and log-polar coordinate transform;
correcting said first image based on said correction information;
performing a correlation comparison of said corrected said first image and said second image; and
determining if the corrected first image matches the second image based on results of said correlation comparison.

10. An image matching method as set forth in claim 9, wherein said performing a Fourier transform includes performing a second Fourier transform to the results of said log-polar coordinate transform of said first image and said second image, and
said generating correction information includes generating scalar information and/or rotation information as said correction information based on correlation strength of said Fourier transformed first image and second image, and
said correcting includes correcting said first image based on said scalar information and/or said rotation information.

11. An image matching method as set forth in claim 10, wherein said generating correction information includes generating said scalar information and/or rotation information as said correction information based on correlation strength of phase information said Fourier transformed first image and second image.

12. An image matching method as set forth in claim 10, wherein said correcting includes correcting said first image based on said scalar information and/or said rotation information and performing a Fourier transform on said corrected first image and second image, and
said performing a correlation comparison includes performing a correlation comparison between said Fourier transformed corrected first image and said Fourier transformed second image.

13. An image matching method as set forth in claim 10, wherein said correcting includes correcting said first image based on said scalar information and/or said rotation information and performing a Fourier transform on said corrected first image and second image, and
said performing a correlation comparison includes performing a correlation comparison between phase information of said Fourier transformed corrected first image and said Fourier transformed second image.

14. An image matching method as set forth in claim 9, wherein said performing a Fourier transform includes performing a Fourier-Mellin transform to said first image and said second image, and performing processing for correlation between said Fourier-Mellin transformed first image and second image, and
said generating correction information includes generating said scalar information and/or rotation information as said correction information.

15. An image matching method as set forth in claim 9, wherein said correcting includes generating parallel movement information of said corrected first image and second image based on a peak position of correlation strength of phase information of said corrected first image and second image, and extracting common areas of said first image and said second image from said movement amount information,
said performing a correlation comparison includes performing a correlation comparison between said extracted common areas, and
determining if the corrected first image matches the second image includes determining if the corrected first image matches the second image based on results of said correlation comparison between said extracted common areas.

16. An image matching method as set forth in claim 9, wherein said correcting includes generating parallel movement information of said corrected first image and second image based on a peak position of correlation strength of phase information of said corrected first image and second image, and
determining if the corrected first image matches the second image is performed when said parallel movement information is smaller than a predetermined amount of parallel movement.

17. A computer readable medium including computer executable instructions, wherein the instructions, when executed by a processor, cause the processor to perform a method for matching a first image and a second image, the method comprising:
performing a Fourier transform and a log-polar coordinate transform to said first image and said second image;
generating correction information of said first image based on the results of said Fourier transform and log-polar coordinate transform;
correcting said first image based on said correction information;
performing a correlation comparison of said corrected said first image and said second image; and
determining if the corrected first image matches the second image based on results of said correlation comparison.

18. A computer readable medium as set forth in claim 17, wherein performing a Fourier transform includes performing a second Fourier transform based on results of said log-polar coordinate transform of said first image and said second image, and
said generating correction information includes generating scalar information and/or rotation information as said correction information based on correlation strength of said Fourier transformed first image and second image, and
said correcting includes correcting said first image based on said scalar information and/or said rotation information.

19. A computer readable medium as set forth in claim 18, wherein said generating correction information generates said scalar information and/or rotation information as said correction information based on correlation strength of phase information said Fourier transformed first image and second image.

20. A computer readable medium as set forth in claim 19, wherein said correcting includes correcting said first image based on said scalar information and/or said rotation information generated at said first routine, performs a Fourier transform on said corrected first image and second image, and
said performing a correlation comparison performs correlation comparison processing based on phase information of said Fourier transformed corrected first image and said Fourier transformed second image.

21. A computer readable medium as set forth in claim 18, wherein said correcting includes correcting said first image based on said scalar information and/or said rotation information and performs a Fourier transform on said corrected first image and second image, and said performing a correlation comparison performs correlation comparison processing based on said Fourier transformed corrected first image and said Fourier transformed second image.

22. A computer readable medium as set forth in claim 17, wherein said performing a Fourier transform performs a Fourier-Mellin transform to said first image and said second image, performs processing for correlation between said Fourier-Mellin transformed first image and second image, and generates said scalar information and/or rotation information as said correction information.

23. A computer readable medium as set forth in claim 17, wherein said correcting generates parallel movement information of said corrected first image and second image based on a peak position of correlation strength of phase information of said corrected first image and second image, and extracts common areas of said first image and said second image based on said movement amount information, said performing a correlation comparison performs a correlation comparison of said extracted common areas, and said determining includes determining if the corrected first image matches the second image based on results of said correlation comparison of said extracted common areas.

24. A computer readable medium as set forth in claim 17, wherein said correcting generates parallel movement information of said corrected first image and second image based on a peak position of correlation strength of phase information of said corrected first image and second image, and said determining includes determining if the corrected first image matches the second image when said parallel movement information is smaller than a predetermined amount of parallel movement.

25. An image matching system for matching a first image and a second image, comprising:

a correction information generating unit configured to perform a Fourier transform and a log-polar coordinate transform on said first image and said second image, and to generate correction information of said first image based on the results of said Fourier transform and log-polar coordinate transform;

a correction unit configured to correct said first image based on said correction information to generate a corrected first image;

a correlation unit configured to perform a correlation comparison between said corrected first image and said second image; and a matching unit configured to determine if the corrected first image matches the second image based on results of said correlation unit.

* * * * *